United States Patent [19]

Kumm

[11] Patent Number: 5,011,458
[45] Date of Patent: Apr. 30, 1991

[54] CONTINUOUSLY VARIABLE TRANSMISSION USING PLANETARY GEARING WITH REGENERATIVE TORQUE TRANSFER AND EMPLOYING BELT SLIP TO MEASURE AND CONTROL PULLEY TORQUE

[75] Inventor: Emerson L. Kumm, Tempe, Ariz.

[73] Assignee: Kumm Industries, Inc., Phoenix, Ariz.

[21] Appl. No.: 406,975

[22] Filed: Sep. 12, 1989

Related U.S. Application Data

[63] Continuation-in-part of Ser. No. 269,471, Nov. 9, 1988, abandoned.

[51] Int. Cl.⁵ .......................... F16H 9/10; F16H 59/46
[52] U.S. Cl. .......................................... 474/49; 74/640; 74/866; 475/210
[58] Field of Search .................. 474/18, 28, 49, 52, 474/56, 70, 109; 74/866; 475/208–211

[56] References Cited

U.S. PATENT DOCUMENTS

| | | | |
|---|---|---|---|
| 3,253,658 | 5/1966 | Bradley | 170/135.72 |
| 3,340,749 | 9/1967 | Magg et al. | 74/689 |
| 3,479,908 | 11/1969 | Kress et al. | 74/681 |
| 3,527,119 | 9/1970 | Nasuytis | 74/681 |
| 3,670,594 | 6/1972 | Roper | 74/689 |
| 3,822,610 | 7/1974 | Erban | 74/691 |
| 4,024,772 | 5/1977 | Kumm | 74/230.16 |
| 4,290,320 | 9/1981 | Abbott | 74/689 |
| 4,295,836 | 10/1981 | Kumm | 474/51 |
| 4,335,629 | 6/1982 | Falzoni | 74/689 |
| 4,402,237 | 9/1983 | Tomlinson | 74/689 |
| 4,459,872 | 7/1984 | Tibbles | 74/701 |
| 4,526,061 | 7/1985 | Sakakibara et al. | 74/701 X |
| 4,553,450 | 11/1985 | Gizard | 74/689 |
| 4,579,021 | 4/1986 | Yamamuro et al. | 74/869 |
| 4,587,866 | 5/1986 | Kraus | 74/691 |
| 4,591,351 | 5/1986 | Kumm | 474/49 |
| 4,619,629 | 10/1986 | Sugematsu et al. | 474/28 |
| 4,627,308 | 12/1986 | Moroto et al. | 475/210 |
| 4,644,820 | 2/1987 | Macey et al. | 74/689 |
| 4,665,773 | 5/1987 | Hiramatsu et al. | 74/866 |
| 4,673,378 | 6/1987 | Tokono et al. | 474/18 |
| 4,682,511 | 7/1987 | Wittke | 74/681 |
| 4,706,518 | 11/1987 | Moroto et al. | 74/689 |
| 4,714,452 | 12/1987 | Kumm et al. | 474/49 |
| 4,824,419 | 4/1989 | Kumm | 474/49 |

FOREIGN PATENT DOCUMENTS

| | | | |
|---|---|---|---|
| 3212769 | 10/1983 | Fed. Rep. of Germany | 74/740 |
| WO85/02663 | 6/1985 | PCT Int'l Appl. | 74/701 |

Primary Examiner—Allan D. Herrmann
Assistant Examiner—Khoi Q. Ta
Attorney, Agent, or Firm—Richard G. Harrer; Charles E. Cates

[57] ABSTRACT

A continuously variable, regenerative transmission is disclosed in which a continuously variable transmission assembly is employed in conjunction with a regenerative gear assembly incorporating high and low clutches and situated intermediate a prime mover, such as a vehicle engine, and an output, such as the drive train to vehicle wheels. By monitoring certain system conditions (such as the rate and direction of rotation desired for the output, the rate of rotation of the engine and belt slip) while simultaneously controlling the engine speed, a control subsystem adjusts the effective diameters of input and output pulleys of the continuously variable transmission assembly to obtain a pulley torque versus belt tension that gives a belt slip value which results in rotation of the output in the desired direction at a rate according to a predetermined ratio schedule of the rate of rotation of the engine with respect to the rate of rotation of the output under the measured instantaneous conditions and in view of the output speed desired.

24 Claims, 16 Drawing Sheets

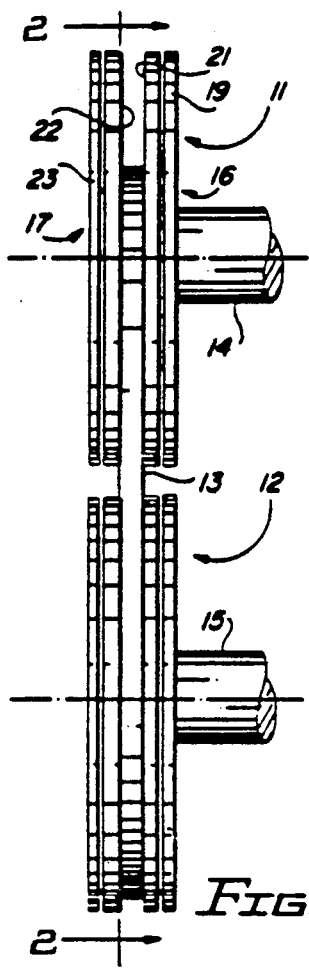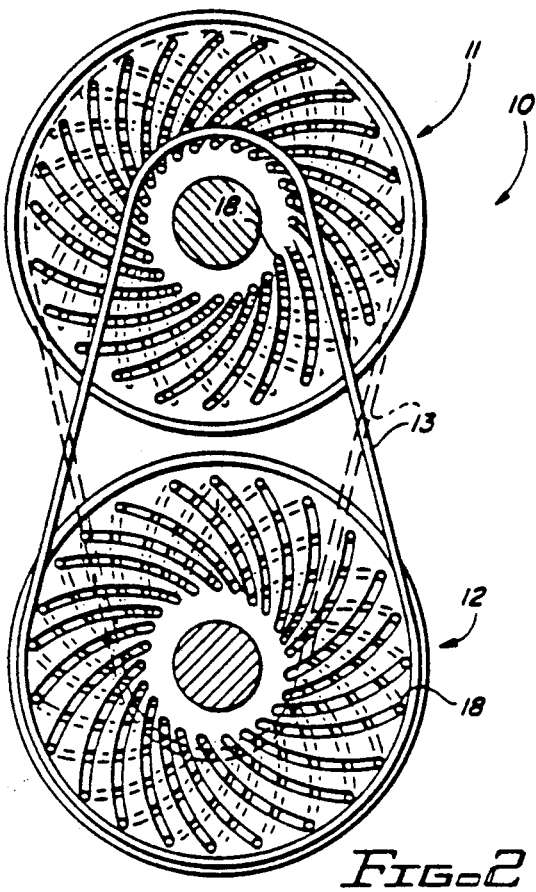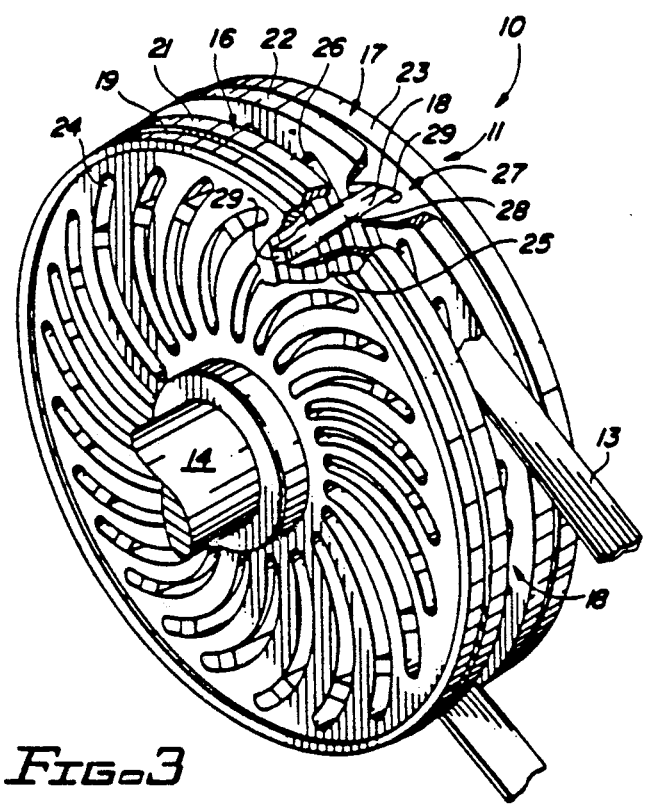

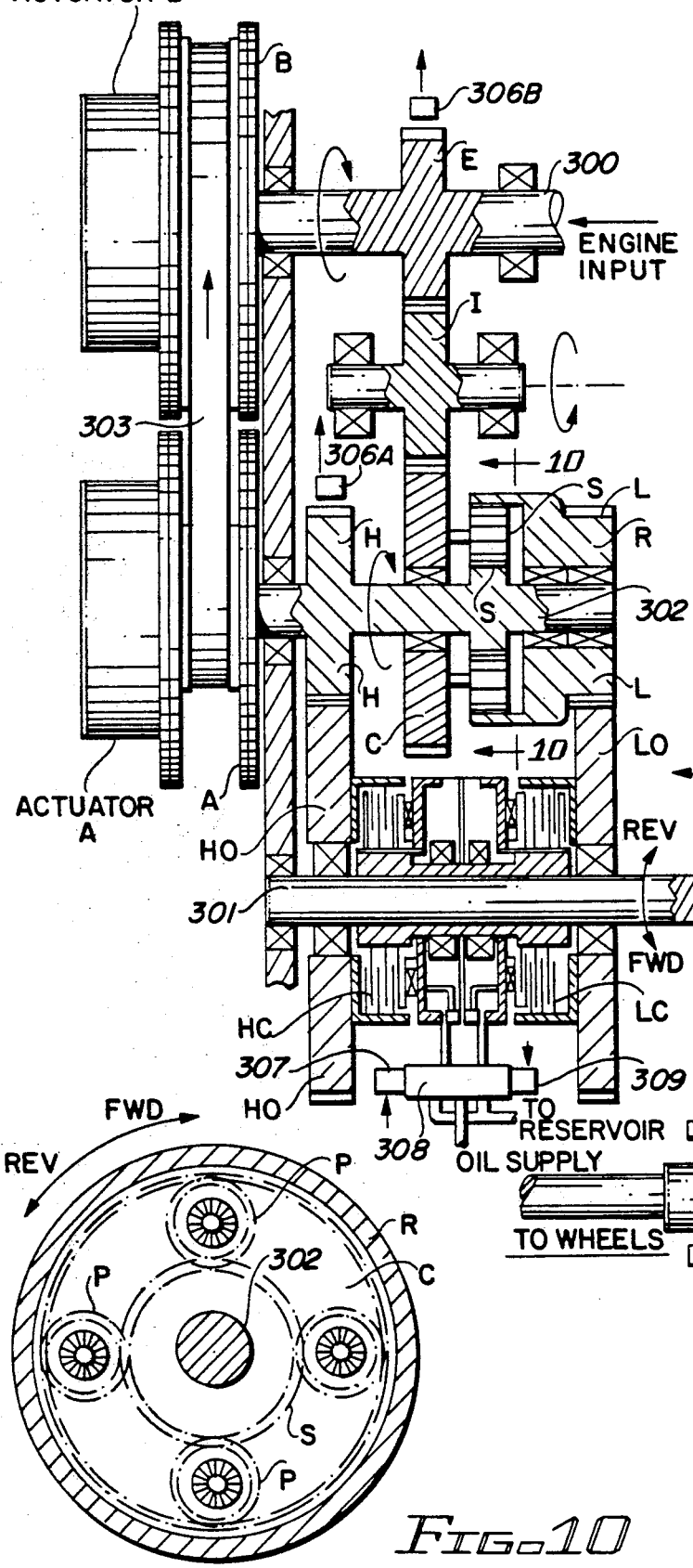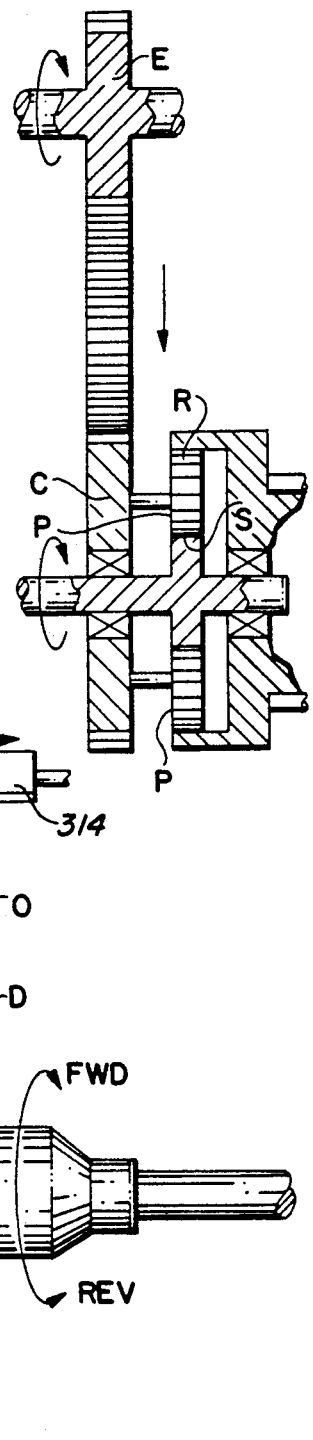
Fig. 9
Fig. 9A
Fig. 10

FIG. 19

OPERATIONAL RANGE (TYPICAL)

| VEHICLE MODE | PARK | REVERSE | NEUTRAL | DRIVE | DRIVE |
|---|---|---|---|---|---|
| SPEED MODE | LOW | LOW | LOW | LOW | HIGH |
| ACCELERATOR POSITION | IDLE | VARIABLE | IDLE | VARIABLE | VARIABLE |
| DYNAMIC BRAKING POSITION | IDLE | VARIABLE | IDLE | VARIABLE | VARIABLE |
| ENGINE SPEED | IDLE | VARIABLE | IDLE | VARIABLE | VARIABLE |
| 335A, PULLEY A RADIUS, mm | 50 | 50-40 | 50 | 50-88 | 88-40 |
| 335B, PULLEY B RADIUS, mm | 90 | 90-98 | 90 | 90-53 | 53-98 |
| 306A, PULLEY A SPEED, RPM | 1080 | 1080-8000 | 1080 | 360-8000 | 360-8000 |
| 306B, PULLEY B SPEED, RPM | 600 | 600-3265 | 600 | 600-4500 | 600-4500 |
| 332A, PULLEY A CONTROL | IDLE | VARIABLE | IDLE | VARIABLE | VARIABLE |
| 332B, PULLEY B CONTROL | IDLE | VARIABLE | IDLE | VARIABLE | VARIABLE |
| 334B, PULLEY B DIRECTIONAL CONTROL | NORMAL | NORMAL | NORMAL | NORMAL | NORMAL |
| 336A, PULLEY A PRESSURE SENSOR, PSI | 20 | 20-400 | 20 | 20-400 | 20-400 |
| 336B, PULLEY B PRESSURE SENSOR PSI | 60 | 60-400 | 60 | 60-400 | 60-400 |
| 307, TRANSMISSION CLUTCH | OFF | ON | OFF | ON | OFF |
| 309, TRANSMISSION CLUTCH | OFF | OFF | OFF | OFF | ON |

NOTE: MAXIMUM VEHICLE SPEED OF 106 MPH CORRESPONDS TO MAXIMUM PULLEY A SPEED OF 8000 RPM WITH MAXIMUM ENGINE SPEED OF 4500 RPM FOR CHOSEN GEAR REDUCTIONS.

CONTINUOUSLY VARIABLE TRANSMISSION USING PLANETARY GEARING WITH REGENERATIVE TORQUE TRANSFER AND EMPLOYING BELT SLIP TO MEASURE AND CONTROL PULLEY TORQUE

This application is a continuation-in-part application Ser. No. 07/269,471 filed Nov. 9, 1988, now abandoned.

FIELD OF THE INVENTION

The present invention relates to variable speed transmissions and particularly to an improved transmission which employs a known type of continuously variable transmission in combination with a shifting gearbox to provide increased efficiency and power handling capabilities over a full speed range

BACKGROUND OF THE INVENTION

Presently available continuously variable transmissions (CVTs) have the ability to vary speed ratios in infinitesimal steps over a wide range of speeds to permit automotive engines to be operated at the most efficient speed for the load conditions and to be rapidly and smoothly shifted to a ratio that allows maximum engine power when required. However, use of the CVT has been severely limited by poor power handling capacity and relatively low efficiency of many CVTs which negates most of the advantages in improving the operating efficiency of automotive engines. For high power ratings required for automotive applications, four types of CVTs are available. These are the hydrostatic, the V-belt, the traction, and the flat belt types.

The hydrostatic CVT, such as those manufactured by the Eaton Corporation, designated as Eaton Hydrostatic Transmissions Model 33 through Model 76, consist of a variable displacement hydraulic pump driving a fixed displacement hydraulic motor. These are commercially available in capacities up to 200 HP for use on heavy construction equipment and provide full load operating efficiencies of over 85%. The speed ratio is continuously variable from full forward to full reverse. The generally large size requirements, high noise, low efficiency and cost make this type unsuitable for automotive applications.

The V-belt type of CVT, such as one developed in Holland by van Doorne Transmissie, which has been utilized in Fiat, Renault, Subaru and Ford automobiles, is similar to a conventional V-belt drive except that the relatively complex, multi-segmented belt is made wide so that the faces of the pulleys on which it rides can be moved together or apart. Moving the faces of one pulley together and the faces of the other pulley apart causes the belt to ride at a larger radius on the first pulley and at a smaller radius on the second pulley thus causing the speed ratio of the first and second pulleys to increase. This type of transmission is capable of operating at speed ratios in excess of 4:1, but it has no reverse capability. It has been applied to relatively low powered automobiles at ratings of up to 60 HP with efficiencies reported to approach 90%.

The traction type of transmission, such as described in U.S. Pat. No. 3,822,610 by Erban, typically consists of hardened steel rollers operating against a pair of toroidal discs. An extremely high contact force allows the rollers to transmit considerable power without slippage. Tilting the rollers changes the drive ratio between the discs. The device is capable of an efficiency of over 98% at full forward and 80% in full reverse with power ratings of several hundred horsepower being possible. However, the high cost of the required high strength materials limits its applicability. Also, continuous operation of the traction type of transmission at a constant speed ratio often leads to wear of the toroidal discs and subsequent control difficulties.

The flat belt type of transmission such as described in U.S. Pat. No. 4,295,836 by Emerson L. Kumm, has various advantages relative to the other variable speed transmissions as described above including higher efficiencies over a wider speed ratio range and a more compact size for a given power with a relatively low cost belt. However, it does not have a reverse capability, and, like V-belt CVTs, its minimum output speed is above zero, increasing with increases in the input speed.

One known example of an attempt to improve the use of a CVT by combining it with a gear mechanism is found in U.S. Pat. No. 3,527,119. This device, however, utilizes a unidirectional variable speed motor which can be selectively coupled to one of two plural paths to control the relative speeds. Each path can be stopped separately to achieve shifting without requiring braking but cannot be shifted under load. The variable speed drive is non-reversible and the device has only limited use for automotive applications.

One known example of measuring torques is shown in U.S. Pat. No. 3,253,658. Here, the torque of a shaft is obtained rather than the pulley belt slip which is used to measure torque in the subject transmission. The belt slip, while giving a measure of the pulley or shaft torque, gives a more critical and vital measurement of the pulley operation; i.e., the belt efficiency and durability.

OBJECTS OF THE INVENTION

It is therefore a broad object of the present invention to provide an CVT which is more efficient and has greater power capabilities for automotive applications than prior art CVTs.

It is another object of this invention to permit use of a CVT over a full speed range, including reverse, with reduced losses and increased capacity.

A principal object of this invention is to provide CVT control that optimizes the durability and efficiency of the belt used with the pulleys.

It is a further object of this invention to combine a CVT with a shift mechanism to obtain two speed modes, to extend the output speed range and to increase the output torque capability at low speed.

It is another object of this invention to utilize the CVT with its control to provide a very wide range of dynamic braking for a vehicle.

A still further object of the invention is to insure that all power shift transfer operations occur between shafts rotating at the same speeds.

A further object of this invention is to obtain reversal of the output speed without shifting gears or clutches or interrupting the power flow.

Another object of the invention is to provide a CVT having the capability of operating at a condition resulting in zero output speed at all possible input speeds.

A still further object is to give a control that can optimize the acceleration of a vehicle.

An additional object is to provide a CVT system that can operate a vehicle at the minimum fuel consumption for any required power and output speed.

And last, but not least, an object of this invention is to provide a geared CVT of reduced size and cost.

SUMMARY OF THE INVENTION

These and other objects of the invention are achieved with the combination of a continuously variable transmission (typically, the Kumm flat belt CVT) and a normal planetary mechanism using measurements and calculations of the belt slip in the rotating pulleys to adjust the operating pulley speed ratio and control the input and output speed. In the low speed mode, the input power is divided into two paths; viz.: a first path through the planetary gearing to the output and a second path directed regeneratively from the planetary gearing through the CVT back to the input shaft. In the high speed mode, a clutch on the shafting from the planetary ring gear to the output shaft is disengaged and another clutch is engaged which permits the input power to be transmitted directly through the CVT to the output shaft. The clutch operation occurs with the shafts rotating at the same speed, and no interruption in power flow or torque occurs since the non-operating clutch is always engaged before the other clutch is disengaged. Only the pulley radius ratio control reverses direction during the change from the low speed to the high speed mode or vice versa. Reverse output speeds are made available by changing the radius ratio control direction in the CVT when in the low speed mode without actuating clutches. Here, in reverse, as in the low speed mode, the power flow is divided into two paths, and the input power operates regeneratively through the CVT to the planetary gearing and back to the input shaft while supplying power through the planetary gearing to the output shaft. Thus, continuous operation over the full speed range from full forward through zero to full reverse is obtained.

The control of the CVT speed ratio, which is based on the belt slip, basically measures the torque passing through the pulley and adjusts the pulley speed ratio as desired to control the pulley torque and hence the regenerative torque transfer, while the engine speed is being regulated. As a result, excessive or unwanted regenerative torque transfers at low or zero output speeds are avoided.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 is an edge on view of driving and driven pulley assemblies coupled by a flat belt and representative of a class of continuously variable transmissions in which the present invention finds application;

FIG. 2 is a cross sectional view, taken along the lines 2—2 of FIG. 1, of the pulley assembly system illustrated in FIG. 1;

FIG. 3 is a fragmentary perspective view, partially broken away, of a pulley assembly particularly illustrating the relationships between inner and outer guideway disk components and belt engaging element components;

FIG. 9 is a schematic layout of a flat belt CVT with regeneratively geared two speed mode transmission;

FIG. 10 is a cross sectional view taken along the lines 10—10 of FIG. 9;

FIG. 19 is a chart showing typical operational ranges for the pulley radii and speeds;

GENERAL TRANSMISSION CONSIDERATIONS

Figure 4:
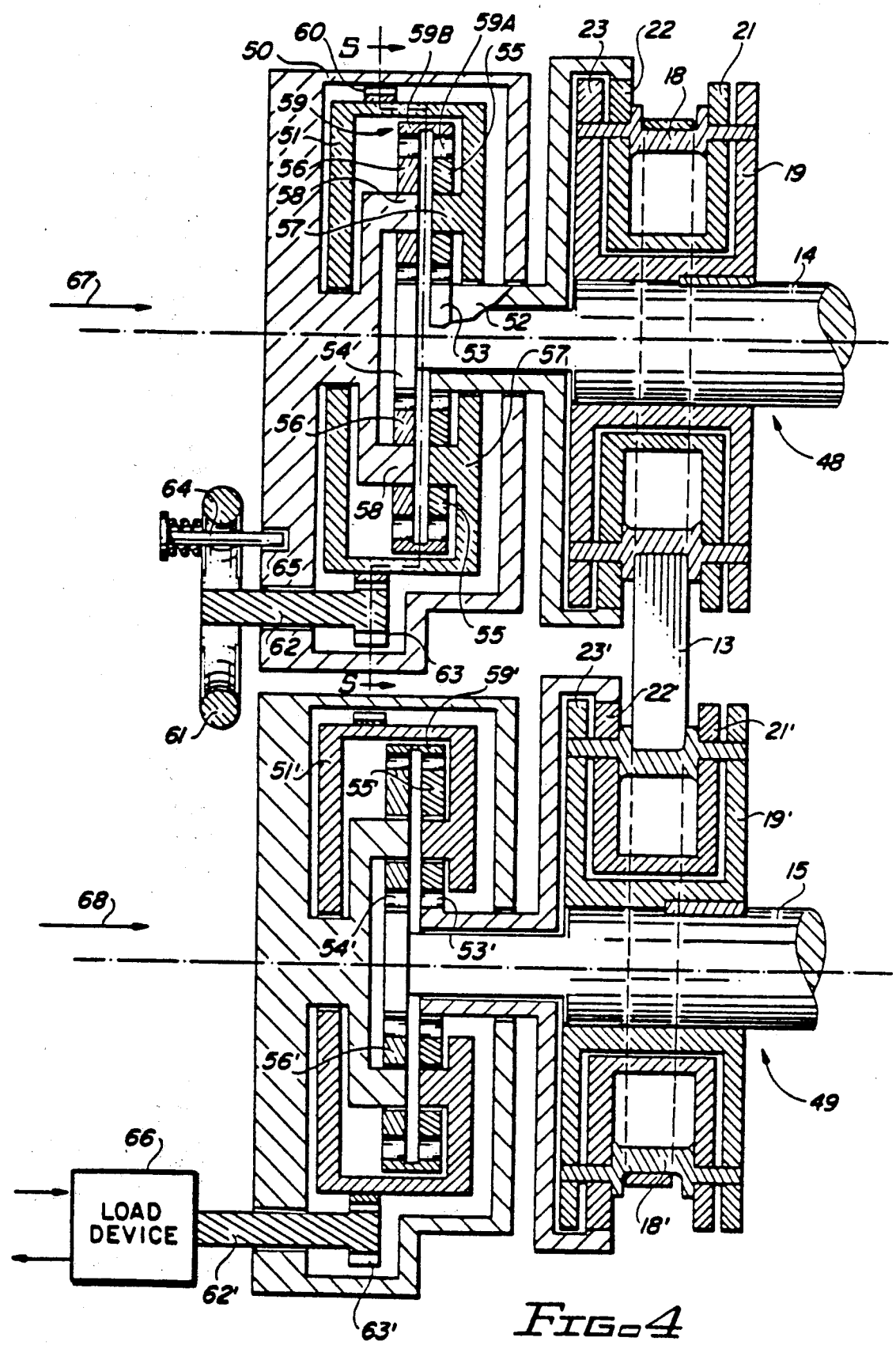
FIG. 4 is a simplified cross sectional view of a flat belt CVT illustrating the fundamental aspects of the mechanical components of the control system for establishing the angular relationship between the inner and outer guideway disks of each pulley.

Many different arrangements of regenerative transmissions have been designed which have the capability of giving reverse to forward output speeds by changing the speed ratio of two or more shafts in the transmission. U.S. Pat. No 3,670,594 gives a typical illustration and description of such regenerative transmissions. A continuously variable pulley-belt design permits the speed ratio of two shafts to change in an infinitely variable fashion over a speed ratio range defined by the pulley geometry. Since the output speed of the transmission varies from reverse to forward speeds; at a specific operating point, the output speed can be zero for any input speed. Such operation can be achieved without any gear shifting of the type normally required in an automotive transmission to go from forward to reverse operation. The elimination of an additional shaft and gears normally required for reverse output speed is a major reduction in the size and cost of this transmission as used in an automobile.

However, all such infinitely variable transmissions have inherently regenerative torque transfer through the gearing and the continuously variable components which, depending on the input shaft power, can easily be excessive at low to zero output speeds leading to slippage and excess wear in the variable speed components or breakage of components. The subject invention solves the problem of excessive regenerative torques at zero and low speeds in an infinitely variable transmission that can give reverse to forward output speed for various unidirectional input speeds. In addition, a special arrangement is described in which the Kumm flat belt CVT is especially suited for a regenerative transmission in that a relatively small CVT component can be optimally employed with large input torques and give very high output to input torque ratios. The incorporation of a zero shaft velocity change during a shift to use the flat belt CVT components in a direct drive arrangement without regenerative torque transfer extends the output speed range by a major factor and permits high cruise speeds to be obtained at low engine speed in the application to an automobile.

DETAILED DESCRIPTION OF THE INVENTION

Referring now to FIGS. 1, 2 and 3, fundamental aspects of the Kumm flat belt type of continuously variable transmission are illustrated as embodied in a variable diameter pulley drive system 10 including variable diameter pulley assemblies 11 and 12 connected by a flat drive belt 13. The pulley assembly 11 will be considered as the driving pulley assembly and the pulley assembly 12 as the driven pulley assembly in this discussion, but it will be understood that the roles of these pulley assemblies may be reversed without altering the concepts involved.

The pulley assembly 11 is appropriately mounted on a shaft 14, and the pulley assembly 12 is similarly appropriately mounted on a shaft 15 as is well understood in the art. The pulley assemblies 11 and 12 are similar to each other, and only one of them, pulley assembly 11, will be specifically described in this discussion. The belt 13 as shown in FIG. 3 corresponds to the position of the belt 13 of FIG. 2 in the dashed line position.

The pulley assembly 11 includes a pair of pulley sheaves 16 and 17 between which there extends a series of belt engaging elements 18, the latter being engaged by the belt 13 for driving, or driven, conditions as will be understood. In one construction, there is a series of twenty-four belt engaging elements 18 equally circumferentially distributed such that an angle of fifteen degrees is established between runs of the belt 13 coming off tangentially from one belt engaging element 18 as compared to that of an immediately adjacent belt engaging element 18. Each belt engaging element 18 includes a central shank 28, which engages the belt 13, and bearing regions 29 at each end.

The pulley sheave 16 incorporates a pair of pulley guideway disks 19 and 21 which are parallel to and lie immediately adjacent each other in juxtaposition. Similarly the pulley sheave 17 comprises a pair of pulley guideway disks 22 and 23 which are parallel to and lie immediately adjacent each other in juxtaposition. The longitudinal spacing between the pulley sheaves 16 and 17 (i.e., the axial spacing between the inner guideway disks 21 and 22) remains the same irrespective of the radial adjustment of the belt 13 for different driving or driven speeds. This spacing is sufficient to accommodate with clearance the belt drive element which supports the belt 13 which is selected to carry the load that the system is designed for as is well understood.

The range of radial adjustment or position of the belt 13 on the pulley assembly 11, as may be envisioned by the solid line and dashed line positions of belt 13 in FIG. 2, is achieved by altering the radial positions of the belt engaging elements 18. For example, in FIG. 2 the belt engaging elements 18 are close to the center of the shaft 14 in the solid line position of the belt 13 on pulley assembly 11; conversely, the belt engaging elements are radially farther out, namely adjacent the periphery, when the belt 13 is in its dashed line position which is also the position shown in FIG. 3.

Variations in the radial positions of the belt engaging elements 18 is achieved by relative rotation of the outer guideway disk 19 and the inner guideway disk 21 of pulley sheave 16 to change their angular relationship. Similarly, by identical relative rotation of the guideway disks 23, 22, respectively, of pulley sheave 17 change of angular relationship is accomplished. As a practical matter, to insure synchronous operation, the inner guideway disks 21 and 22 are physically locked together, and the outer guideway disks 19 and 23 are also locked together. Power for such operation, not shown in FIGS. 1, 2 or 3, has been achieved in the prior art typically as disclosed in U.S. Pat. No. 4,295,836 previously referenced. Particularly effective systems for controlling the phase angles between the inner and outer guideway disks are disclosed in the above-referenced U.S. application Ser. No. 051,922, filed May 19, 1987, now U.S. Pat. No. 4,768,996 and U.S. Ser. No. 132,783, filed Dec. 14, 1987, now U.S. Pat. No. 4,810,234. However, as previously noted, the prior art control systems are limited in the precision with which they can establish and/or maintain the speed ratio, and important applications for flat belt CVTs require greater precision than can be obtained with the prior art control systems.

The outer guideway disk 19 has a series of logarithmic spiral guideways 24 therein which progress outwardly from adjacent the center at an angle of forty-five degrees with respect to the pulley assembly radius. Similarly the inner guideway disk 21 has a series of logarithmic spiral guideways 25 radiating outwardly at an angle of forty-five degrees with respect to the pulley assembly radius, but in the opposite sense to the guideways 24 of guideway disk 19. Since the guideways 24 and 25 radiate outwardly at angles of forty-five degrees with respect to the pulley radius, but in opposite senses, the intersections of these guideways exist at ninety degrees at all radial positions. This results in a substantially constant geometry at the intersections of the logarithmic spiral guideways 24 and 25 at all radial positions for receiving the bearing region ends 29 of the belt engaging elements 18. Similarly, the inner guideway disk 22 has a series of logarithmic spiral guideways 26 radiating outwardly identically to the guideways 25 of inner guideway disk 21, and the outer guideway disk 23 includes logarithmic spiral guideways 27 extending outwardly identically to the guideways 24 of outer guideway disk 19. Hence, the guideways 26 and 27 intersect at ninety degrees at all radial positions to give a constant intersection geometry identical to the logarithmic spiral guideways 24 and 25 for receiving the other ends of the belt engaging elements 18.

While forty-five degree spirals have been shown and give ninety degree intersections, it will be understood that logarithmic spirals of other angularities may be used as desired. Also, minor variations from a particular angularity may be tolerated so long as the belt engaging element bearing ends supported at the guideway intersections will move appropriately when the sheaves are rotated relative to each other to change the angular relationship between the inner and outer guideway disks.

It will be clear that the belt 13, as it passes around the pulley assembly 11 or 12, engages the central shank portion of the belt engaging elements 18 and causes one pulley assembly to drive and the other pulley assembly to be driven in the obvious fashion.

The foregoing description of the basic drive system including the pulley assemblies 11 and 12, the belt 13 and the belt engaging elements 18 is set forth in greater detail in U.S. Pat. No. 4,295,836, dated Oct. 20, 1981, previously referred to and does not form a specific part of the invention described in this application, but forms the environment in which the invention functions.

Figure 5:
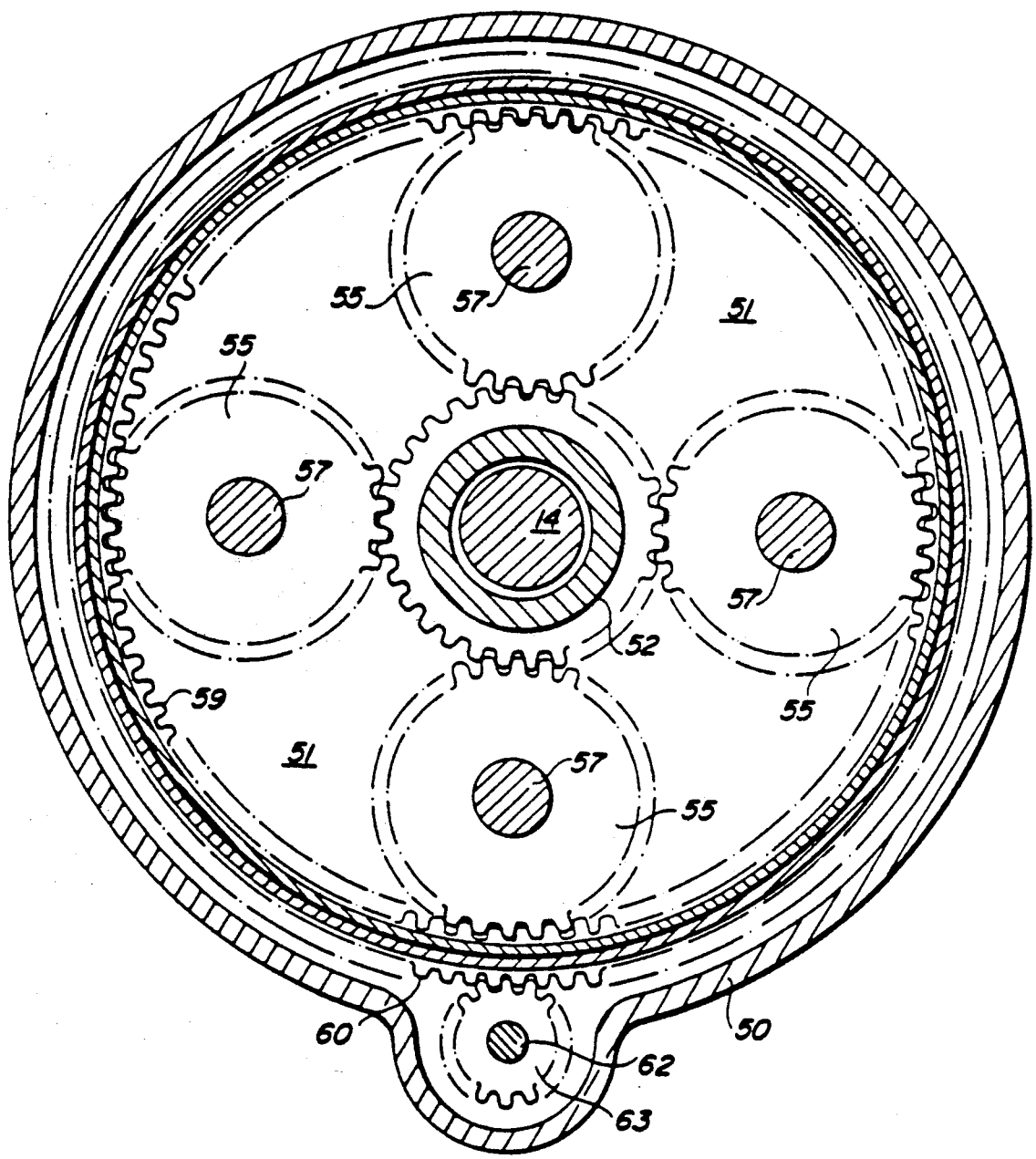
FIG. 5 is a cross sectional view taken along the lines 5—5 of FIG. 4 particularly illustrating a planetary gear assembly component of the control system.

Attention is now directed to FIGS. 4 and 5 illustrating a first embodiment of a CVT which incorporates a geared system for precisely establishing the speed ratio between a first pulley assembly 48 and a second pulley assembly 49. The geared speed ratio control mechanism associated with the upper pulley assembly 48 and that associated with the lower pulley assembly 49 are essentially identical with minor exceptions to be particularly noted in the following discussion. For that reason, the essential description will be set forth in conjunction with the upper pulley assembly 48 in FIG. 4 which, for purposes of illustration, may be deemed the driving pulley assembly whereas the lower pulley assembly 49 is considered the driven pulley assembly.

In each case, the geared speed ratio control mechanism, which serves to establish the angular relationship between the inner and outer guideway disks (and hence the radial positions of the belt engaging elements 18), is contained in a stationary housing 50. A reduced diameter region of the shaft 14 extends into the housing 50 and terminates in an outer sun gear 54. The set of inner guideway disks 21, 22 are directly connected to an hollow shaft 52 which encompasses the end region of the shaft 14 for mutual rotation therewith, and the hollow shaft 52 terminates in an inner sun gear 53. As shown in FIG. 4, the sun gears 53, 54 have the same diameter and the same tooth count which is necessary for a stationary control at specific speed ratios; however, this relationship is not a design constraint of the system which could employ continuously rotating control components. Nonetheless, in the presently preferred embodiments of the invention, the sun gears 53, 54 are identically configured for simplicity.

A planet carrier 51 is disposed for rotation within the stationary housing 50 about the axis of the shaft 14 and carries a plurality of planet gears 55, each supported for rotation on an individual planet gear shaft 57 as shown in FIGS. 4 and 5. Each of the planet gears 55 meshes, at its radially inner (with respect to the axis of the shaft 14) peripheral region, with the inner sun gear 53 and at its radially outer peripheral region with a first set of teeth 59A of an internal ring gear 59. The internal ring gear 59 also carries a second set of internal teeth 59B axially offset from the teeth meshing with the planet gears 55. For a stationary control at specific speed ratios, the teeth of the second set 59B are typically identical to the teeth of the first set 59A.

Similarly, a plurality of star gears 56 are supported in fixed positions by star gear shafts 58 which are integral with the stationary housing 50. The star gears 56 are situated to mesh with both the second set of internal teeth 59B of the internal ring gear 59 and the teeth of the outer sun gear 54 which is directly connected to the shaft 14. The planet gears 55 and the star gears 56 are shown in FIG. 4 in face to face juxtaposition; however, this is only for simplicity of illustration, and it will become apparent below that the angular positions of the planet gears 55, relative to the star gears 56, about the axis of the shaft 14 are changed during operation of the control system.

The planet carrier 51 is provided with an external ring gear 60 with which there is meshed a spur pinion 63. The pinion 63 is manually driven by a speed control crank 61 via a shaft 62. The crank 61 may be constrained against rotation by permitting a crank retaining pin 64 to enter an aperture 65 provided in the stationary housing 50 for this purpose.

The lower pulley assembly 49 does not have a speed control crank, but rather is provided with a load device 66 which is connected by a shaft 62' to a spur pinion 63'. The load device 66 may take any form capable of absorbing and transmitting rotational force. For example, the load device 66 may be a hydraulic motor/pump and its corresponding control system as adapted from the oil motor/pump units described in the above-referenced U.S. Pat. Nos. 4,768,996 and 4,810,234. Another suitable load device is an electrical motor/generator as will be discussed below in conjunction with the description of an alternate embodiment of the flat belt CVT. A still simpler device for the purpose is a spiral torsion spring which generates a torque when wound in one direction and applied to rotate the planet carrier 51' relative to the housing 50', much in the manner of a clock spring.

Consider now the operation of the geared speed ratio control mechanism in the CVT illustrated in FIGS. 4 and 5. Assume first a static condition in which the speed ratio has been previously established and in which the speed control crank 61 is fixed in position by virtue of the retainer pin 64 extending into the aperture 65. Under these conditions, the sets of inner guideway disks 21, 22 and outer guideway disks 19, 23 are rotating at the same rate; consequently, the inner sun gear 53 and the outer sun gear 54 are also rotating at the same rate. Therefore, the planet gears 55 and star gears 56 will be rotating at the same rate and in the same direction. Also, the internal ring gear 59 is rotating within the stationary housing 50 in a direction opposite to that of the rotation of the shaft 14 and the hollow shaft 52. It will also be noted that the planet carrier 51 is not rotating under this steady state condition such that the angular relationship between the positions of the planet gears 55 and the star gears 56 about the axis of the shaft 14 remains fixed.

Now, the operation of the system when it is desired to change the speed ratio between the driving pulley assembly 48 and the driven pulley assembly 49 may be addressed. Since this adjustment only transiently involves changing the relationship among the stationary and moving components, its effect may best be understood by assuming that the shaft 14 is not rotating. Then, once the principles of operation are understood, the actual rotation of the shaft 14 may, in effect, be superimposed as a constant on the other movements of the mechanism.

Thus, temporarily assuming that the shaft 14 is stationary as noted, the speed control crank 61 may be rotated, for example, in the clockwise direction as viewed in the direction indicated by the reference arrow 67. As a result of such rotation of the crank 61, the planet carrier 51 will rotate, at a reduced rate (according to the gear ratio between the spur pinion 63 and the external ring gear 60) in the counter clockwise direction. Since the shaft 14 is deemed to be stationary and the housing 50 is immovable, the internal ring gear 59 is held stationary. Consequently, the movement of the planet gears 55 about the axis of the shaft 14 will drive the inner sun gear 53 in the counter clockwise direction to correspondingly drive the hollow shaft 52 and hence the set of inner guideway disks 21, 22 in the counter clockwise direction with respect to the set of outer guideway disks 19, 23 which are fixed to the shaft 14. As a result, the belt engaging elements 18 will move radially outwardly in unison (assuming the orientation of the logarithmic slots of the upper pulley assembly 48 corresponds to those of the driving pulley 11 illustrated in FIG. 2) to thereby increase the effective diameter of the driving pulley assembly 48. Once the desired incremental adjustment has been completed, the speed control crank 61 may again be fixed in place to maintain the new angular relationship between the planet gears 55 and star gears 56 to accordingly maintain the new pulley speed ratio. As previously noted, all this transient adjustment is simply superimposed on the actual rotation of the several components such that the adjustment to the relative angular positions of the set of inner guideway disks 21, 22 to the outer guideway disks 19, 23 actually takes place during pulley rotation and power transfer When the radial positions of the belt engaging elements 18 of the driving pulley assembly 48 move radially outwardly, the belt engaging elements 18' of the driven pulley assembly 49 must move radially inwardly since the belt 13 has a fixed length and the distance between the shafts 14 and 15 is fixed. Assuming for the moment that the driven shaft 15 is stationary, the set of outer guideway disks 19', 23', are also stationary. Therefore, the set of inner guideway disks 21', 22' must have moved counter clockwise as viewed from the direction indicated by the reference arrow 68. As the set of inner guideway disks 21', 22' moves counter clockwise, the inner sun gear 53' also rotates counter clockwise. Therefore, the planet gears 55' rotate clockwise. Since the driven shaft 15 is assumed to be stationary, the star gears 56' cannot rotate such that the internal ring gear 59' is also held stationary. Consequently, the action of the planet gears 55' enmeshed with the teeth of the internal ring gear 59' is such as to cause the planet carrier 51' to rotate counter clockwise. Therefore, the spur pinion 63' is rotated, at a multiplied rate, in the clockwise direction to drive the load device 66 in the clockwise direction via the shaft 62'.

This action takes place in synchronism with the adjustment to the relative positions of the planet gears 55 and star gears 56 of the driving pulley assembly 48; this action ceases and a new steady state condition is assumed when the speed control crank 61 is again fixed in position. However, during the transient operation, the load device 66 will have functioned as such. For example, if the load device 66 is an oil motor/pump it will have functioned transiently as a pump. If the load device 66 is a motor/generator, it will have functioned transiently as a generator. If the load device is a spring, it will have been wound to some degree.

It will be readily apparent that if the speed control crank 61 is manually rotated in the counter clockwise direction, a string of effects opposite to those discussed above will ensue. Briefly, the planet carrier 51 will rotate in the clockwise direction causing the set of inner guideway disks 21, 22 to rotate in the clockwise direction to decrease the effective diameter of the driving pulley assembly 48. The belt engaging elements 18' of the driven pulley assembly 49 will therefore move radially outwardly, and will be assisted by virtue of the load device 66 operating in an energy delivering mode; i.e., as a hydraulic or electric motor or as an unwinding spring rotating in the clockwise direction.

The speed reducing gear arrangement between the pinion 63 and the external ring gear 60 acting in cooperation with the gear reduction afforded by the sun/planet/star gear arrangement provides a substantial overall gear reduction to achieve the desired adjustment fineness for many CVT applications. However, in some applications, such as the previously mentioned geared neutral automatic transmission, it is necessary to obtain a degree of control which is not readily achieved through simply adjusting the gear ratios of the components in the system illustrated in FIG. 4. It is therefore useful to provide apparatus for greatly extending the degree of control which may be achieved by employing a geared control system according to the present invention.

Figure 6A:
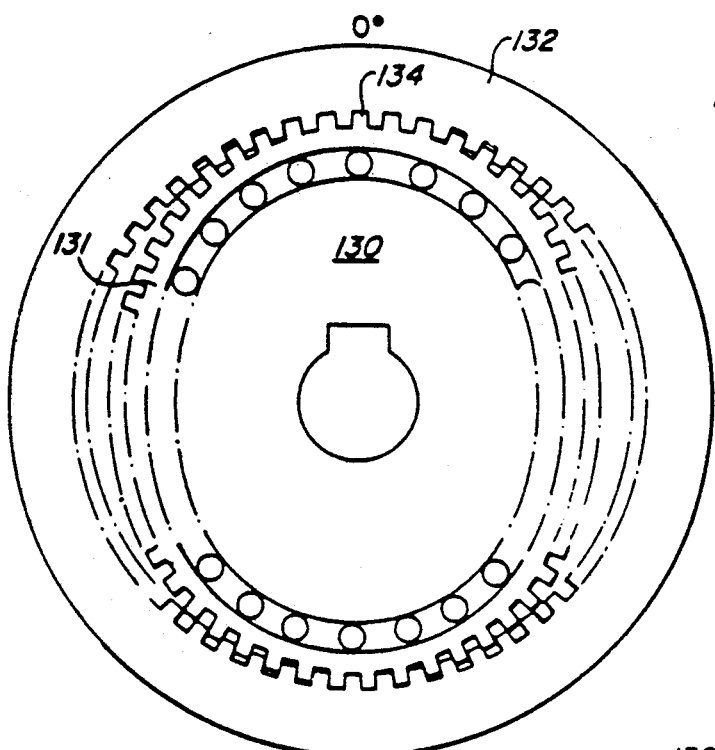
FIGS. 6A, 6B and 6C are illustrations showing the principle of operation of a harmonic drive, certain components being shown in an exaggerated elliptical shape in order to more clearly demonstrate the principle.
Figure 6B:
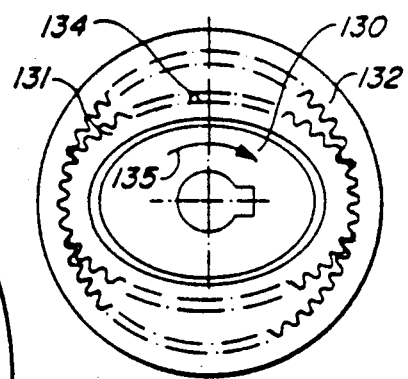
Figure 6C:
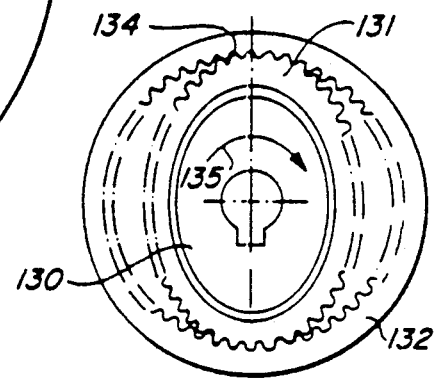

While it is possible to use many different differential gearing arrangements to obtain the desired fineness of operation for critical applications, one embodiment employs a so-called "harmonic" gear drive to provide the differential geared relationship. Referring to FIGS. 6A, 6B and 6C, and particularly to the somewhat enlarged FIG. 6A, the basic principles of a harmonic drive gear reduction apparatus are presented. In this most elementary form, a harmonic drive employs three concentric components to produce high mechanical advantage and speed reduction. The use of nonrigid body mechanics allows a continuous elliptical deflection wave to be induced in a nonrigid external gear, thereby providing a continuous rolling mesh with a rigid internal gear.

Thus, as shown in FIG. 6A, an elliptical wave generator 130 deflects a flexspline 131 which carries outside teeth and therefore meshes with the inside teeth of a rigid circular spline 132. The elliptical shape of the flexspline and the amount of flexspline deflection is shown greatly exaggerated in FIGS. 6A, 6B and 6C in order to demonstrate the principle. The actual deflection is very much smaller than shown and is well within the material fatigue limits.

Since the teeth on the non-rigid flexspline 131 and the rigid circular spline 132 are in continuous engagement and since the flexspline 131 typically has two teeth fewer than the circular spline 132, one revolution of the wave generator 130 causes relative motion between the flexspline and the circular spline equal to two teeth. Thus, with the circular spline 132 rotationally fixed, the flexspline 131 will rotate in the opposite direction to the wave generator (the system input in the example) at a reduction ratio equal to the number of teeth on the flexspline divided by two.

This relative motion may be visualized by examining the motion of a single flexspline tooth 134 over one-half of an input revolution in the direction shown by the arrow 135. Since the input to the wave generator 130, in the example, causes clockwise rotation of the wave generator, the flexspline rotates counterclockwise. Thus, referring to FIG. 6B, it will be seen that the tooth 134, after one-quarter revolution of the wave generator 130, has moved counter clockwise one-half of one flexspline tooth position. It will also be noted that when the wave generator 130 axis has rotated 90°, the tooth 134 is fully disengaged. Full reengagement occurs in the adjacent circular spline tooth space when the major axis of the wave generator 130 has rotated 180° as shown in FIG. 6C, and the tooth 134 has now advanced one full tooth position. This motion repeats as the major axis rotates another 180° back to zero, thereby producing the two tooth advancement per input revolution to the wave generator 130.

Conventional tabulations of harmonic drive gear reduction ratios assume the flexspline is the output member with the circular spline, rotationally fixed. However, any of the drive elements may function as the input, output or fixed member depending upon whether the gearing is used for speed reduction, speed increasing or differential operation.

The harmonic drive principle can be extended by the addition of a fourth element designated the dynamic spline. The dynamic spline is an internal gear that rotates at the same speed and in the same direction as the flexspline. Unlike the circular spline (to which it is parallel, also engaging the flexspline), the dynamic spline has the same number of teeth as the flexspline. Flexspline shape rotation results in tooth engagement/disengagement within the same tooth space of the dynamic spline such that the ratio between the two is one to one. The system, therefore, is a flexspline output with the same characteristics as the three element harmonic drive model; i.e., gear reduction ratio tabulated with the direction of rotation opposite to the input. Ultra high dual ratio capability can be obtained by using two circular splines in mesh with the flexspline with each developing a different single-stage ratio. Merely by way of example, the compounding of single-stage ratios of 160:1 and 159:1 results in a total reduction ratio of 12,720:1. Harmonic drives suitable for use in a flat belt CVT may be obtained from the Harmonic Drive Division of Quincy Technologies, Inc. in Wakefield, Mass.

Figure 7:
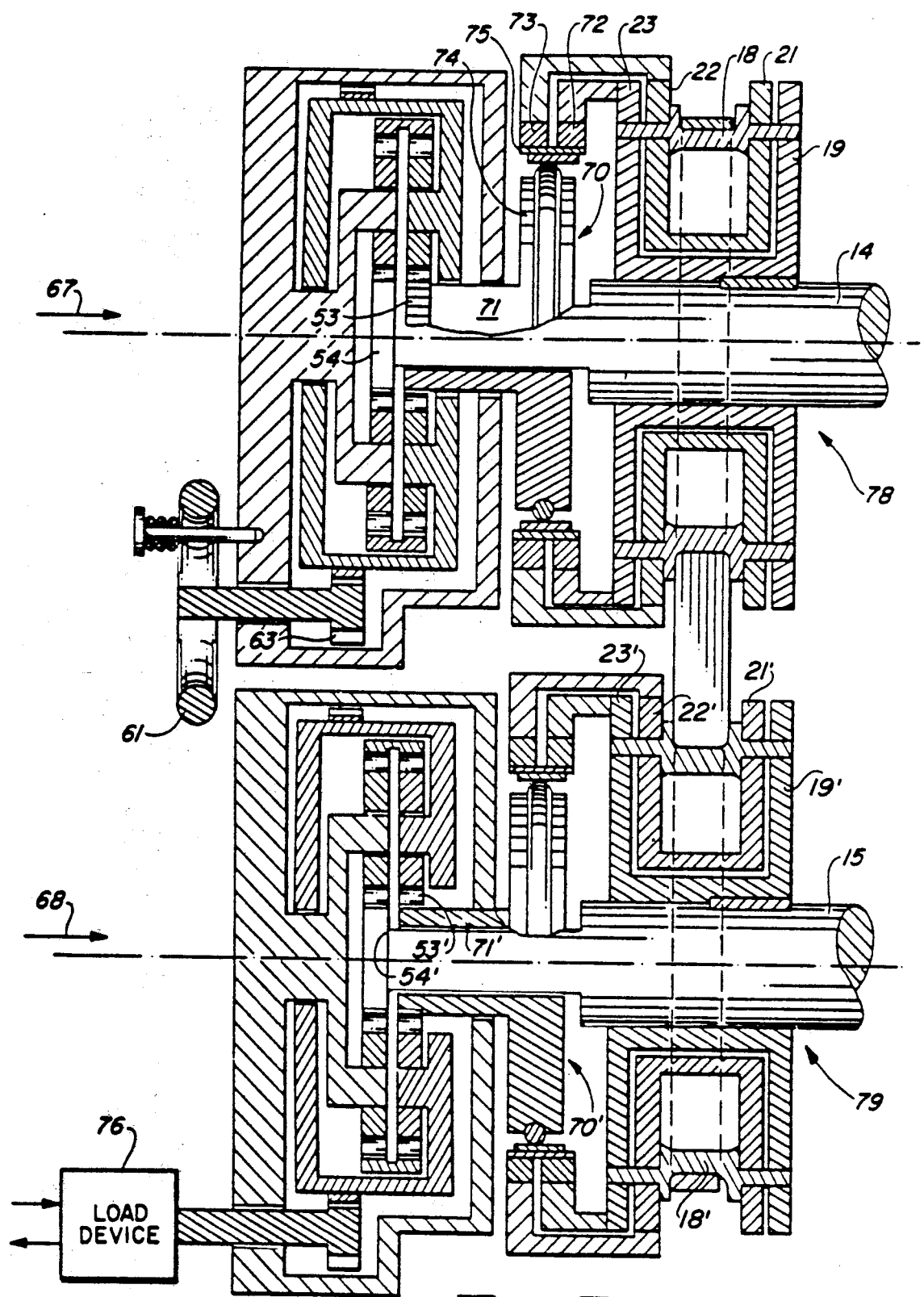
FIG. 7 is a simplified cross sectional view of a flat belt CVT illustrating the fundamental aspects of the mechanical components of a variant of the subject control system, employing a harmonic drive, for establishing the angular relationship between the inner and outer guideway disks of each pulley.

Consider now, with reference to FIG. 7, the manner in which a harmonic drive can be advantageously incorporated into a CVT. A harmonic drive component 70 is interposed between the set of inner guideway disks 21, 22 (and the set of outer guideway disks 19, 23) of the driving pulley assembly 78 and the inner sun gear 53 via a hollow shaft 71. Similarly, another harmonic drive component 70' is interposed between the set of inner guideway disks 21', 22' (and the set of outer guideway disks 19', 23') of the driven pulley assembly 79 and the inner sun gear 53' via a hollow shaft 71'. The driving shaft 14 extends through the hollow shaft 71 and carries the outer sun gear 54 at its end while the driven shaft 15 extend through the hollow shaft 71' and carries the outer sun gear 54' at its end. The remaining structure of the planetary gear assembly is as described in conjunction with FIGS. 4 and 5.

Thus, the set of outer guideway disks 19, 23 are connected to the dynamic spline 72 of the harmonic drive 70, and the set of inner guideway disks 21, 22 are connected to the circular spline 73 of the harmonic drive. The wave generator 74 is directly connected to the hollow shaft 71 and is hence directly coupled to the inner sun gear 53. Under static conditions in which the speed ratio has been previously established and in which the speed control crank 61 is fixed in position, the sets of inner guideway disks 21, 22 and outer guideway disks 19, 23 are rotating at the same rate. Consequently, there is no relative movement between the dynamic spline 72 and circular spline 73 such that the wave generator 74, the hollow shaft 71 and inner sun gear 53 are all rotating at the same rate as the shaft 14 and the outer sun gear 54.

If it is now desired to change the speed ratio between the driving pulley assembly 78 and the driven pulley assembly 79, the speed control crank 61 may be released and turned as previously described. In the following analysis, it may again be assumed that the driving shaft 14 is stationary to best appreciate the transient movements among the several components of the control mechanism. If the speed control crank 61 is rotated in the clockwise direction, the planet carrier 51 rotates in the counter clockwise direction to also drive the inner sun gear 53 in the counter clockwise direction. Therefore, the hollow shaft 71 and the wave generator 74 rotate counter clockwise. This rotation is communicated through the flexspline 75 to both the dynamic spline 72 and the circular spline 73. However, since the shaft 14 is deemed to be stationary and the set of outer guideway disks 19, 23 are fixed to the shaft, the dynamic spline 72 is constrained against rotation. Therefore, for each full revolution of the wave generator 74, the circular spline 73 rotates two teeth in the clockwise direction to effect a precise translation of the belt engaging elements 18 radially inwardly to decrease the effective diameter of the driving pulley assembly 78. This will be recognized as a reversal of the effect achieved by turning the speed control crank 61 in the clockwise direction in the system illustrated in FIG. 4, a straightforward result of the mechanical reversal which takes place across the harmonic drive 70.

In response, the belt engaging elements 18' of the driven pulley assembly 79 will move radially outwardly, and energy will be delivered to the load device 76. However, because of the presence of the harmonic drives 70, 70' in the pulley assemblies 78, 79, the speed control crank 61 and load device 76 will rotate many more turns (equivalent to the gear ratio of the harmonic drive) during the transient speed ratio adjustment operation. Thus, the speed control torque and power required in the transient speed ratio adjustment operation are reduced by the gear ratio of the harmonic drive (not considering efficiency losses). Since the harmonic drive gear ratio is typically of the order of 100:1 or more, the reduction in the control torque and power are very large indeed.

Figure 8:
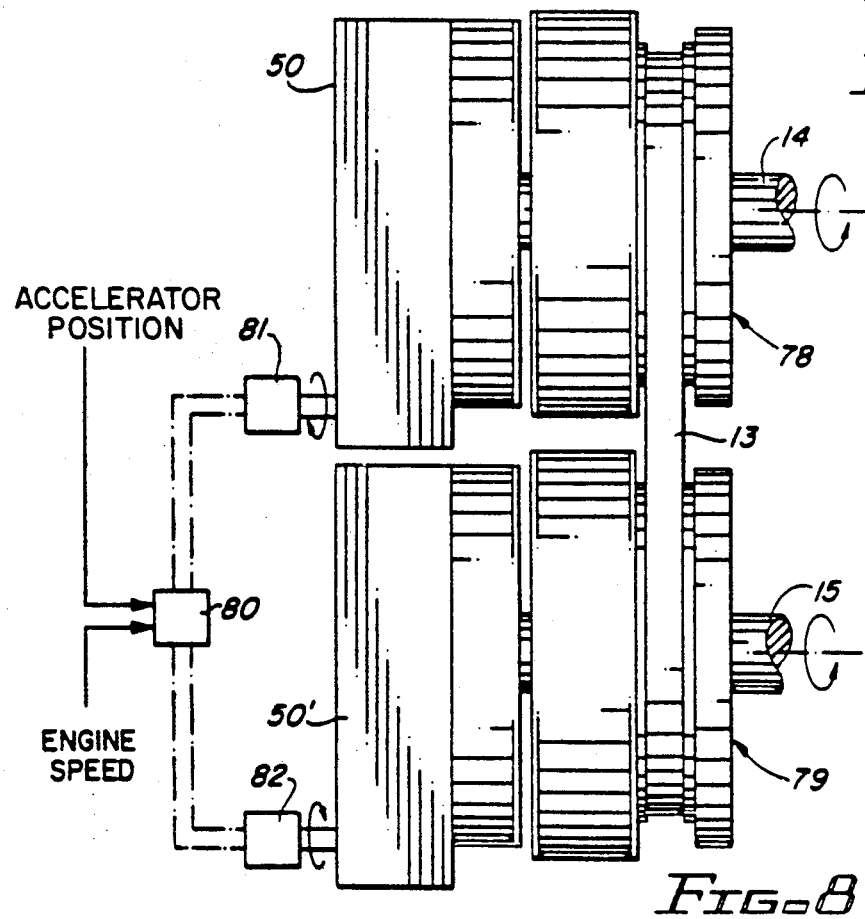
FIG. 8 is a simplified block diagram of an exemplary automatic version of a control system for a flat belt CVT of the type shown in FIGS. 4 and 7.

Those skilled in the art will understand that the incorporation of the harmonic drives 70, 70' into the geared control system serves to greatly magnify the precision of control over the speed ratio between the pulley assemblies of a flat belt CVT. In addition, the torque requirement for the device driving the pinion 63 is accordingly reduced. This feature permits the use of, for example, a small reversible electrical motor as the device connected to the pinion 63 and this, in turn, permits the use of relatively simple external control structure such as that illustrated in FIG. 8 in an exemplary vehicular environment. Thus, normal engine speed and accelerator position information may be analyzed by conventional logic 80 to determine if a change in speed ratio is desirable and, if so, to energize the reversible d-c motors 81, 82 to drive the mechanisms previously described in the appropriate directions until the sought ratio is obtained. In a practical installation, this is an ongoing process to obtain the desired engine torque-speed characteristic giving minimum fuel consumption and, as those skilled in the art will understand, other process variables (coolant temperature, atmospheric pressure, "performance" setting, brake actuation, vehicle speed, etc.) are involved in determining the desired instantaneous speed ratio.

A flat belt CVT employing the principles described above may be incorporated into a regenerative transmission according to the present invention. Thus, the subject invention incorporates a control arrangement for the CVT components which measures and limits the maximum belt slip operating with two pulleys. For a given belt tension in the Kumm flat belt CVT, the maximum pulley torque is specifically related to the belt slip for any specific pulley radius ratio and pulley geometry (pulley radii, pulley center distance, and belt factors). The belt slip measurement provides a measurement of torque that is used in the control. Other devices could be used for measurements of pulley torque and belt tension to obtain control information for the subject transmission (see, e.g., U.S. Pat. No. 3,253,658), but belt slip is the critical parameter and would be calculated or inferred in any case.

At any specific pulley radius, the speed ratio of the two pulleys is uniquely given when operating at zero belt slip. Hence, the belt slippage can be determined by measuring the pulley speed ratio during operation and comparing this value to the zero slip speed ratio for specific pulley radii. Second order effects, such as belt wear, may be corrected using periodic calibration. Such a calibration or control modification can be accomplished at idle or startup of operation where zero vehicle velocity and low output torque (not sufficient to move the vehicle) occur at a slightly changed pulley speed ratio (as compared to the initial control calibration). To implement such a control, it is only necessary to measure accurately the two pulley speeds and the effective radii of the belt in the two pulleys. The accurate measurement of speed is well known in the art, but the simple precise measurement of the effective pulley belt radii in such a CVT has previously been difficult to accomplish in a simple, accurate, low cost fashion. However, use of pulley actuators such as shown in FIGS. 4 and 7 permit the relatively precise determination of the radial position of the belt drive elements through measurement of the number of revolutions of a single shaft in each pulley. The accurate measurement of the number of revolutions of a shaft can be accomplished simply and precisely. Digital electronic equipment can be applied directly to obtain such measurement. Such measurements, as stated above, can be utilized by electronic solid state equipment of high reliability to give the proper output control signals to limit the maximum belt slippage or pulley torque at the low to zero transmission output speed where large regenerative torque transfers would otherwise occur with any significant input torque. Indeed, the same basic control would be utilized by the driver of an automobile using this system to obtain an increase or decrease in output torque to change the vehicle speed by using an accelerator to change the engine speed and the speed ratio for the CVT using control techniques well known to designers of CVTs.

While the geared actuator configurations of FIGS. 4 and 7 have been shown to permit a simple, precise, low cost approach to the measurement of the belt radial position in a pulley, many other techniques also exist to obtain such information. The subject invention is primarily concerned with the use of such information to determine the belt slippage during operation and to operate the pulley actuators to give the necessary pulley speed ratio and belt tension that permits the desired torque to be transmitted with belt slippage that optimizes the overall operation and gives reasonable belt life.

The percent slip of the flat belt on a rotating pulley may be calculated in the following fashion. It is well known that, at zero slip, the velocity of a conventional flat belt composed of high strength cords in a rubber matrix is larger than the pulley surface that it contacts because substantially all of the belt tension is supported by the cords which are located in the rubber matrix at a radius larger than the pulley surface. Hence, for zero slip, the flat belt velocity, VB, is given by the formula:

$$VB = 2Pi\,(R+a)N \text{ ft/min}$$

where
"R" is the radius of the pulley surface in ft.;
"a" is the distance from the pulley surface to belt mean load bearing location (typically, to the center of a single line of cords); and
"N" is the speed of the pulley in RPM.
"Pi" = 3.14159

The quantity "a" of the flat belt will decrease during the life of the belt due to wear. A periodic update of the value of "a" for the control can be accomplished for an automotive drive at startup or idle operation where initial low torque assures an essentially zero slip condition. The two pulleys at zero slip have the same belt velocity giving:

$$2Pi\,(R_1+a)N_1 = 2Pi\,(R_2+a)N_2$$

where "1" refers to the driving pulley and "2" refers to the driven pulley. Solving for "a":

$$a = (R_1 N_1 - R_2 N_2)/(N_2 - N_1)$$

Since it has been shown how that all of the elements determining "a" can be measured very accurately, the control calibration can be updated precisely. It can be shown that a high precision in the measurement of speed and belt radial position in the pulleys is essential to obtaining an adequately precise value of the belt thickness value of "a". The preferred constructions for the geared actuators as described herein allow the necessary precision in the radii, $R_1$ and $R_2$ to be obtained easily. Then, using the new value of "a", the belt slip velocity is calculated for subsequent operation.

$$\text{Slip Velocity} = 2Pi\,(R_1+a)N_1 - 2Pi\,(R_2+a)N_2$$

giving:

$$\text{Percent Slip} = (1 - (N_2 R C_2)/(N_1 R C_1))100\%$$

where $RC_1 = R_1 + a$ and $RC_2 = R_2 + a$. This calculation of slip is independent of changes in belt length with operation.

While many regenerative geared arrangements are possible, one attractive configuration using a conventional planetary geared relationship is shown in FIG. 9 for an automotive drive. The engine input via the shaft 300 normally supplies torque or power except when the engine is used to slow down the vehicle. This engine torque added to torque from pulley B is transmitted to the planetary carrier, C, in the low speed mode via the E-I and I-C gear meshes, gear I being an idler employed to obtain the same directions of rotation of components E and C. (Those skilled in the art will understand that the same result can be obtained with other arrangements such as a cogged belt coupling components E and C. as shown in FIG. 9A) Referring also to FIG. 10, the planetary carrier C drives the internal ring gear R, via the planetary gears P, in the planetary gear set to give torque via the low speed gear L to the output shaft 301 and its output gear driving through the low output shaft gear LO and its clutch LC.

The planet carrier also simultaneously drives the sun gear S and hence pulley A which is located on the sun gear shaft 302. In the low speed mode, the high speed clutch HC is open so that no power passes through the high speed gear H to the high output shaft gear HO. Torque and power from the sun gear S to pulley A is then transmitted via a flat belt 303 to pulley B and through shaft 300 to be added to the engine input power to give torque on the carrier C. Thus, the power transmitted through the CVT acts in an input regenerative fashion increasing the torque and power transmitted through the planetary and pulley system relative to the engine power.

As previously mentioned, at low output speeds, a significant engine input power can, through regenerative torque transfer, result in excessive pulley and shaft torques which has previously substantially limited the use of such regenerative transmission arrangements. However, the subject transmission system measures a small practical belt slip to sense pulley torque at belt tensions suitable for the employed belt to continuously adjust the pulley speed ratio (using actuators A and B) while regulating engine speed to prevent excessive torques from occurring. Excessive regenerative torque transfer can only occur at low vehicle speeds, but is dependent on the magnitude of engine torque. The output torque is always proportional to the pulley torques and gear torques at any operating point, differing only due to small gear and shaft bearing efficiency losses. The input torque to the planet carrier C is variable dependent on the amount of regenerative torque buildup. In a given arrangement, an output torque necessary to give a specific output speed and/or acceleration-deceleration (i.e., for a vehicle) requires specific pulley speed ratio, input torque and speed. Since the input torque and speed of a typical power supply (e.g., an automotive engine) may be varied over a very wide torque and speed range as desired to give various powers, the regeneratively geared system can be adjusted as desired by changing the pulley speed ratio. The previous problem relating to the possibility of excessive torques at zero or low output speeds is solved in this system by measuring belt slip in the pulleys as previously described to obtain a value which is directly related to the torques through the system and responsively using an actuator to change the pulley radius ratio or speed ratio, i.e., to program an output speed that requires less torque while the engine speed is being simultaneously regulated. In the zero velocity output case, the pulley radius ratio is set accordingly to give as low a pulley torque as desired for the automotive application for any specific engine speed.

Figure 11:
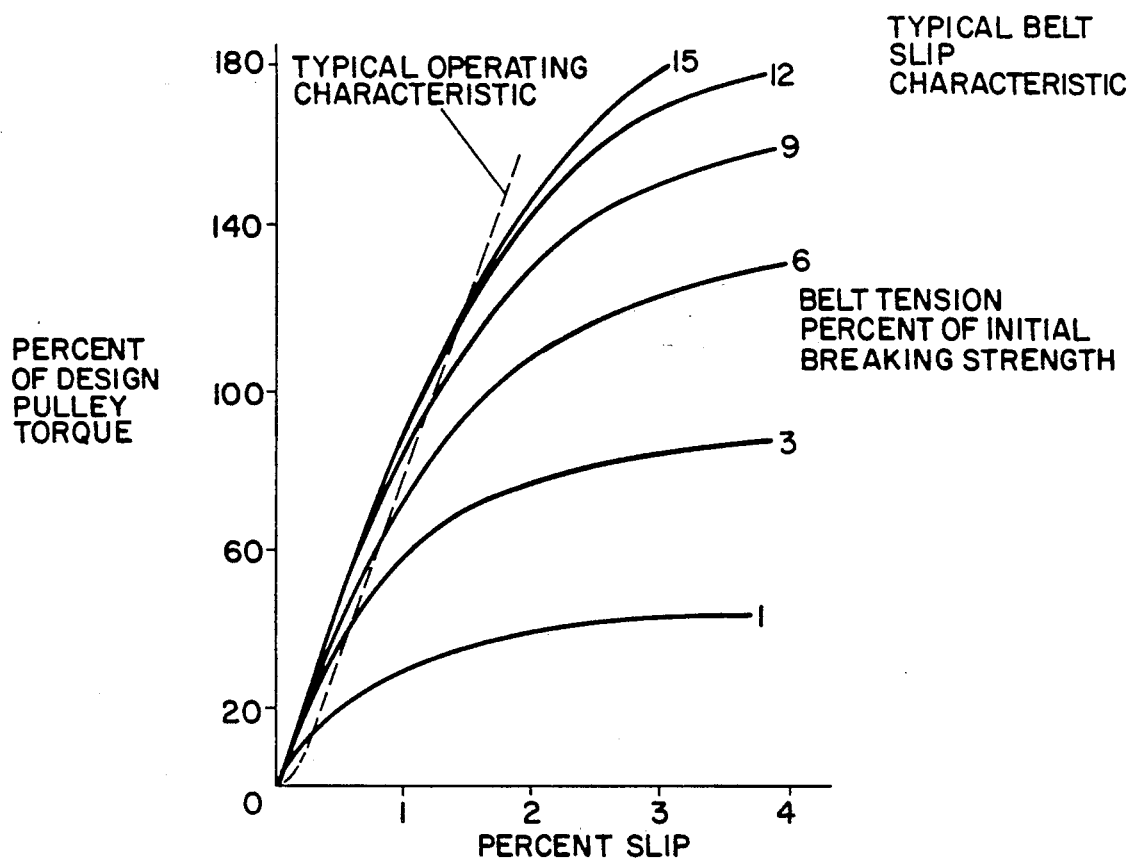
FIG. 11 is a plot representative of input torque versus percent of flat belt slip for a typical mid size vehicle.
Figure 12:
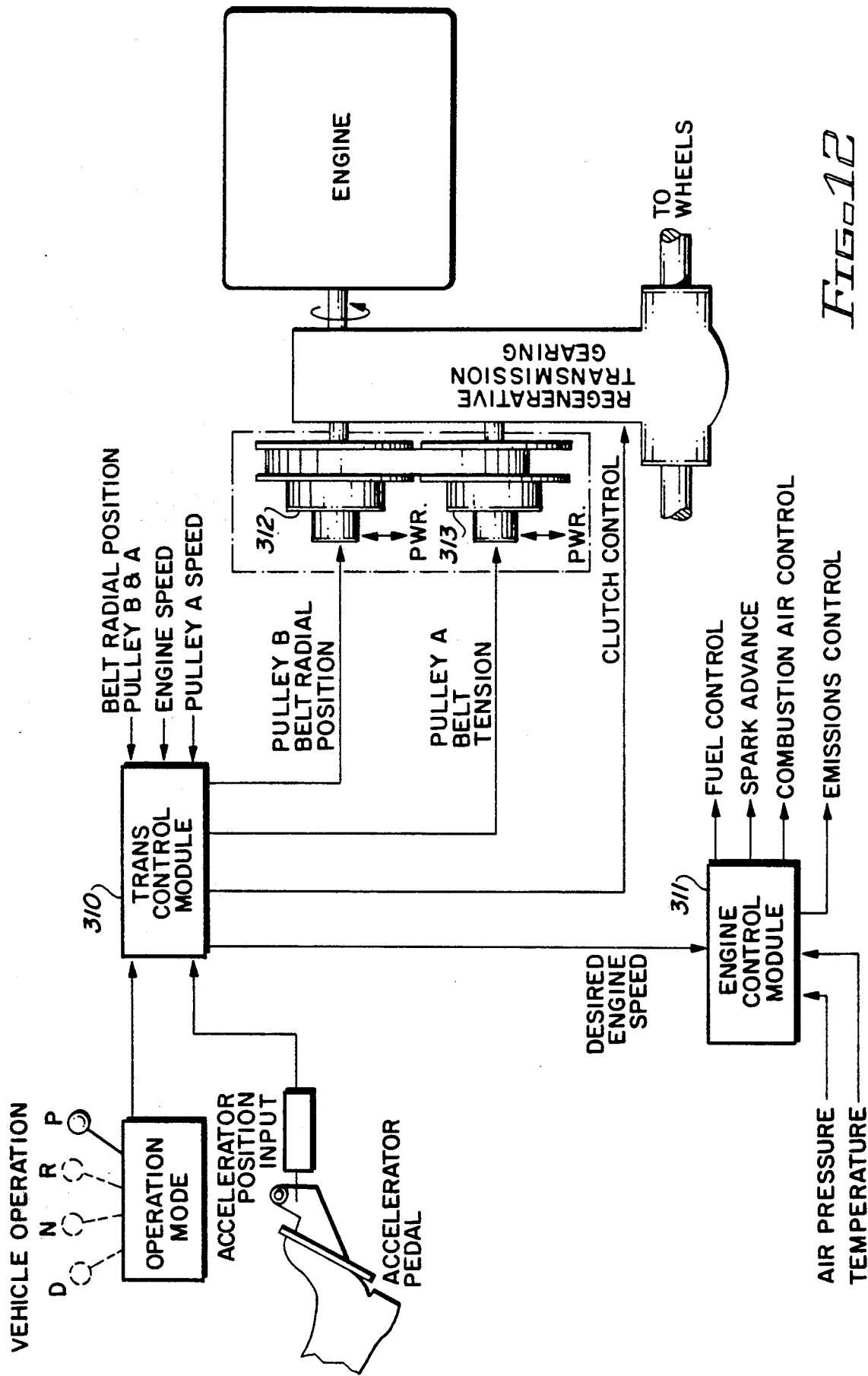
FIG. 12 is a schematic layout of the control arrangement of the transmission of FIG. 9 as applied to an automotive engine.

FIG. 11 shows the slip characteristics typical of a specific belt and pulley arrangement as determined from tests. The percent slip depends on the belt tension, and the input torque can be increased with increases in belt tension up to the maximum desired belt tension. The maximum operating belt tension and maximum percent slip depend on many parameters operation duration, belt ultimate strength and its change with operation, specific belt-pulley characteristics such as the friction coefficient and its variation with operation, etc. Typically, the maximum belt tension is limited to about 10-15% of the initial ultimate belt strength with a maximum belt slip of 1-1.5%. The control schematic as shown in FIG. 12 would use the belt slip characteristics of FIG. 11 as applied to the transmission arrangement of FIG. 9.

While a control scheme may vary in certain details to accomplish the desired control characteristic, one approach for operation in the low speed and reverse speed modes that has considerable merit would be to (in a vehicle) use the accelerator position to specify belt slip; i.e., minimum to maximum accelerator position to correspond to minimum to maximum belt slip or minimum to maximum pulley torque possible with operating pulley belt radii. Simultaneously, the engine speed could be programmed to change with vehicle speed; i.e., low engine speed at zero vehicle speed increasing as the vehicle speed increases to give the desired torque and power for the vehicle acceleration characteristic as set by the accelerator up to the shift point going into the high speed mode. Also, a large depression of the accelerator calling for a large vehicle acceleration would set a high engine speed to vehicle speed ratio which would then result in an acceleration in the low speed mode up to a higher vehicle and engine speed at the shift point for the high speed mode as compared to the shift point speeds resulting from a smaller depression of the accelerator.

Figure 13:
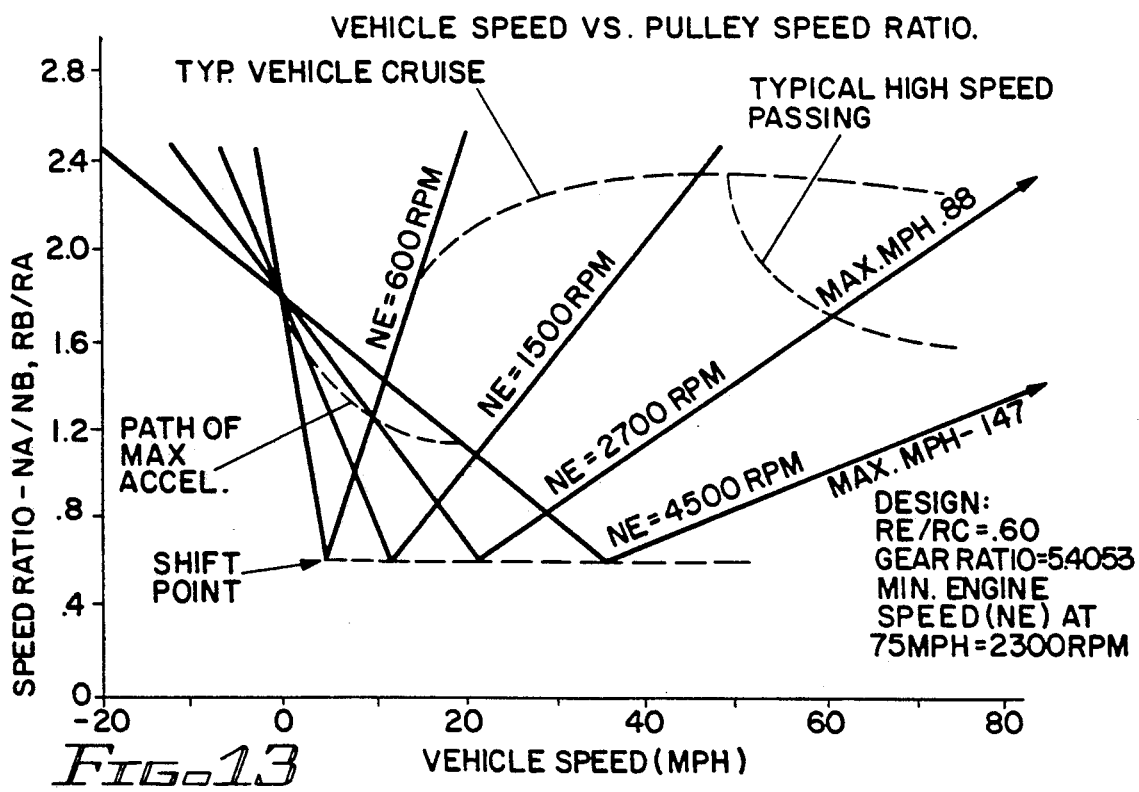
FIG. 13 is a graph which shows a typical vehicle speed versus the pulley speed ratio using the transmission arrangement of FIG. 9 and control arrangement of FIG. 12.

The resulting vehicle speed versus engine speed for a typical transmission is shown in FIG. 13 which will be discussed subsequently. As shown schematically in FIG. 12, a transmission control module 310 is used to regulate the engine speed through the engine control module 311 and operate the actuators 312, 313 on pulleys B and A respectively, to give the desired pulley speed ratio and pulley torque. Inputs to the transmission control module include the operation mode, the accelerator position, the engine speed or pulley B speed, pulley A speed, and measurements of the belt radial positions in pulleys A and B. The speed and belt radial position inputs permit the belt slip to be directly measured in the transmission control module.

The outputs from the transmission control module 310 include a clutch control corresponding to the operation mode and the vehicle to engine speed ratio, a control that positions the belt radial position in pulley B, another output that sets the belt tension as desired for the regulated belt slip in pulley A as shown by the operating characteristic of FIG. 11, and an output to the engine control module 311 that regulates the engine speed. Various specific control logics can be employed to regulate and control the belt slip to the desired levels. One control logic consists in part of measuring the belt slip as previously discussed and comparing it to the desired belt slip given as a function of the accelerator position, engine speed and vehicle speed to determine a belt slip error. This error measurement is then used to operate the actuators on pulley A and pulley B to change belt tension and/or pulley radius ratio. However, change in the pulley speed ratio will also change the engine speed for a specific vehicle speed. Hence, the engine fuel control will change the fuel flow to maintain the scheduled engine speed, thus modifying the torque supplied by the engine to the transmission. A change in engine torque changes the pulley torque reducing the belt slip error as desired. Another control logic could use the belt slip error to directly operate the engine fuel control to change engine torque to reduce this error in one control loop. Other control loops would simultaneously, but independently, operate the actuators on pulley A and pulley B to change belt tension and/or pulley ratio as a function of the accelerator position, engine speed and vehicle speed. Even though the engine speed is affected simultaneously by the different control loops, differences in their control time constants can prevent uncontrolled oscillations in the control. Other control logics may also be possible, but the basic concept consists of using the measurement of belt slip and its regulation to give both belt durability and optimum performance in transmissions. Thus, the transmission control module 310 and the engine control module 311 may use solid state electronics to control scheduling as desired using techniques and construction well known in the industry.

FIG. 13 gives the pulley speed ratio versus the vehicle speed for various engine speeds in the specific transmission as shown in FIG. 9. The available pulley speed ratio permits vehicle operation from reverse to forward speeds in the low speed mode (power passing through the planetary gearing) and, after the shift, operation at forward speeds in a high speed mode (no power passing through the planetary gearing). It will be observed that the engine speed may be varied at zero vehicle speed with an engaged low speed mode clutch and that the maximum reverse speed as well as the forward speed at the shift point (low to high speed mode) and maximum forward speed all increase with increasing engine speed. Due chiefly to the regenerative gearing arrangement, the engine can easily give the maximum design vehicle acceleration at low vehicle speeds with low engine speeds. Hence, the engine speed control can operate to call for an engine speed that is initially low at low vehicle speed but increasing with increasing vehicle speed in the maximum vehicle acceleration condition.

The path typical of such a maximum acceleration is shown in FIG. 13 and it is noted that the maximum engine speed of 4500 RPM may be obtained only on reaching a vehicle speed of 20 mph. Thus, the engine transient speed acceleration can be reduced from the conventional automotive transmission characteristic where the engine speed is not dependent on the vehicle speed. Further, a significant advantage is obtained in that the actuation speed requirement of the variable speed pulleys is reduced with this transmission arrangement. The speed ratio, NA/NB or RB/RA, requires the vehicle to accelerate from zero to 36 mph while changing from 1.8 to 0.60. This will normally take several seconds for a conventional mid size vehicle. In level cruise operation, the engine speed may be reduced to a minimum value corresponding to a pulley speed ratio as given in this design of 2.45. The possible engine acceleration rate is again limited by the vehicle speed to result in reasonably low pulley actuator rates. Lower actuator rates are desirable to reduce the actuator power requirement. However, it should be noted that the maximum vehicle acceleration is still available at maximum engine torque in the high speed mode which normally occurs at engine speeds substantially lower that the maximum engine speed. It is possible to obtain a very rapid pulley radius change in the high speed mode at a given vehicle speed by using a reversal in the actuator control pressure employing a directional control valve. This would give a very rapid increase in engine speed suitable for a high speed passing maneuver.

The transmission operation must encompass many conditions. Consider operation with the transmission in the forward drive position, but stopped going up a hill. The accelerator may be depressed slightly calling for increased output torque, thus providing adequate engine speed and torque to prevent the vehicle from moving backward. The regenerative torque buildup is limited partly by the low engine torque and transmission losses but also by components which would measure belt slip at known belt tensions to give the desired pulley torque by adjusting the pulley radius ratio. Thus, normally, the driver would limit the regenerative torque buildup by reducing the accelerator movement since the vehicle would normally move forward for any significant regenerative torque buildup.

Maximum forward acceleration in the low speed mode uses the control to limit the pulley torque at low speeds where regenerative torque transfer is large. Thus, the driver of an automobile calling for maximum vehicle acceleration may "floor" the accelerator to give maximum torque to the wheels. Simultaneously, the engine speed is regulated as desired and the belt tension on the pulleys is increased to a maximum programmed amount by the actuator on pulley A demanding a larger pulley A radius. The actuator on pulley B operates permitting the pulley B radius to decrease thus calling for and permitting a higher output speed. At the initial start, the vehicle speed being zero, if the actuator on pulley B had called for too high an output speed, the regenerative torque transfer will give pulley torques resulting in excessive belt slip. But if the belt slip is being monitored, the actuator on pulley A can then be controlled to give the maximum permissible belt slip giving the maximum output torque possible from the engine and allowable without excessive belt slip throughout the critical low speed range.

As has been discussed, in the low speed mode, the output speed varies from zero to a shift speed point while the speed ratio in the pulleys varies correspondingly from a low value of NB/NA or RA/RB to the maximum value of NB/NA or RA/RB. The maximum pulley speed ratio NB/NA and gears may all be chosen so that, at the shift point, the complete planetary gear set operates at the same speed; i.e., the sun gear S speed equals the carrier gear C speed equals the ring gear R speed. Hence, at the shift point, the high speed gear H will be rotating at the same speed as the low speed gear L. If the high speed gear H and low speed gear, L, were chosen to have different sizes, the shift point giving the same output speed is changed. While this may be useful in some applications, the maximum pulley radius ratio change is adequately utilized using the H and L gears of the same size.

At the shift point where the pulleys have reached their maximum value of NB/NA or RA/RB, the high speed mode clutch HC is engaged before the low speed mode clutch LC is disengaged so that the drive can continuously accelerate the vehicle without hesitation. Operation in the high speed mode occurs with torque transfer occurring from pulley B to pulley A rather than from pulley A to pulley B as in the low speed mode. The planetary gears do not transfer any torque to the output shaft in the high speed mode. The high speed mode output wheel-to-pulley torque ratio at the shift point equals the low speed mode output wheel-to-pulley torque ratio. Hence, with proper design, the automatic shift would be substantially unnoticeable. The power flow from the engine in the automotive application in the high speed mode operation passes through pulley B to pulley A via the flat belt 303, to gear H, through the H-HO gear mesh to the HO gear and hence through the HC clutch to the differential gear D (gear mesh O-D) and to the wheels.

Figure 14:
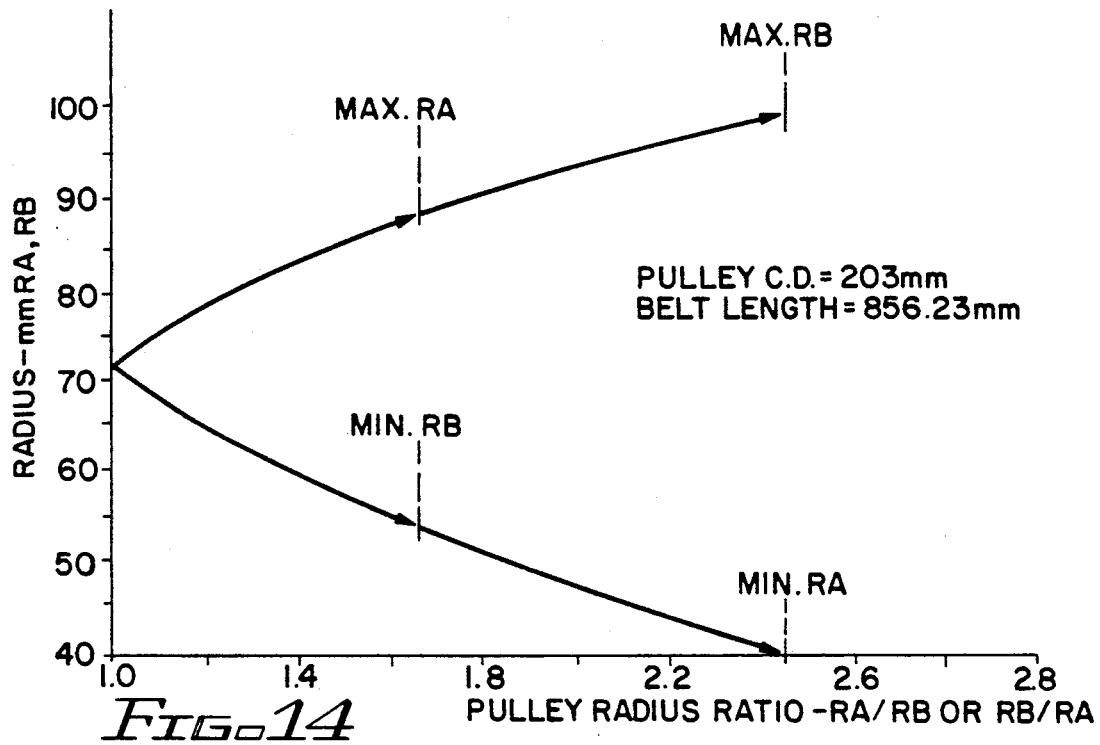
FIG. 14 is a graph which shows the typical belt geometry in the pulleys for a mid size vehicle.

Pulley B is designed to be larger in size than pulley A as shown in FIG. 14 since the maximum torque required to be taken from the engine occurs in the high speed mode just after the shift. The relatively large minimum diameter of pulley B permits very large input torques to be used with comparatively small overall pulley geometry, a major advantage of this arrangement. It may be shown that, when using a flat belt whose cord diameter varies proportionally to the minimum diameter of the driving pulley, the pulley minimum torque capacity varies with the square of the diameter of the driving pulley for a belt tension that is a constant percent of the belt breaking strength.

The typical belt geometry as shown in FIG. 14 was chosen for operation with an engine giving a maximum output torque of 200 Newton-meters at 2700 RPM. The belt radius in pulley B varies from 53 mm to 98 mm while the pulley A belt radius is changing from 88 mm to 40 mm. With proper belt tension, less than 9% of the belt breaking force, a flat belt of 50 mm width can transmit 200 Newton-meters at a pulley radius of 53 mm with slippage of less than 1.3% at 2700 RPM in the Kumm flat belt CVT. An unusually compact configuration is available using a pulley center distance of 203 mm giving basic advantages in size and cost of this system. The overall scheme permits a vehicle to achieve maximum speeds considerably above 100 MPH yet operate when desired at comparatively low engine speeds for high vehicle cruise speeds as shown in FIG. 13.

The actuator control for the pulleys in the high speed mode is somewhat reversed from the control in the low speed mode. In the low speed mode the belt drive radius of pulley A is increased and the radius of pulley B is decreased to increase the output vehicle speed. In the high speed mode, the belt drive radius of pulley A is decreased and the radius of pulley B is increased to increase the output vehicle speed. Consequently, the actuator control direction must be shifted simultaneously with the clutch operation. However, the belt tension as applied in one pulley by the actuator would continue to operate in the same direction.

Reverse speed can be obtained from this transmission starting from zero output speed when operating in the low speed mode without operating the usual transmission clutches or disengaging the drive from the wheels. The power passes through the planetary gears and the low (L) to low output (LO) gear mesh with the low speed mode clutch (LC) engaged. However, the actuator control is identical to that used in the high speed mode. The pulley geometry permits the belt drive radius of pulley A to be decreased and the radius of pulley B to be increased to increase the speed in the reverse output speed direction. Regenerative torque transfer requires monitoring of the belt slip and adjustment by the actuator to change the pulley B radius to limit the amount of belt slip for any regulated input engine speed. As in the low speed mode, the output torque is related directly to the belt slip that is permitted. It is possible to achieve only relatively modest, though reasonable, reverse speeds since it is desirable to use most of the available pulley speed ratio range in the forward low speed mode. However, design reverse speeds of 9-10 MPH appear easily achievable at engine speeds of 2500 RPM as shown on FIG. 13. The output wheel torque is limited by the maximum pulley torque for the slip that can be tolerated. At low reverse speeds, very large output torques are available at the wheels with maximum pulley belt slip, due in part to the planetary gearing arrangement.

The electronic transmission control also permits using the engine for dynamic braking by compressing engine air at all vehicle speeds. While conventional hydraulic braking would be employed as a backup, the control system would permit obtaining high engine speeds for low vehicle speeds in the low speed mode that would give substantial engine dynamic braking.

Figure 15:
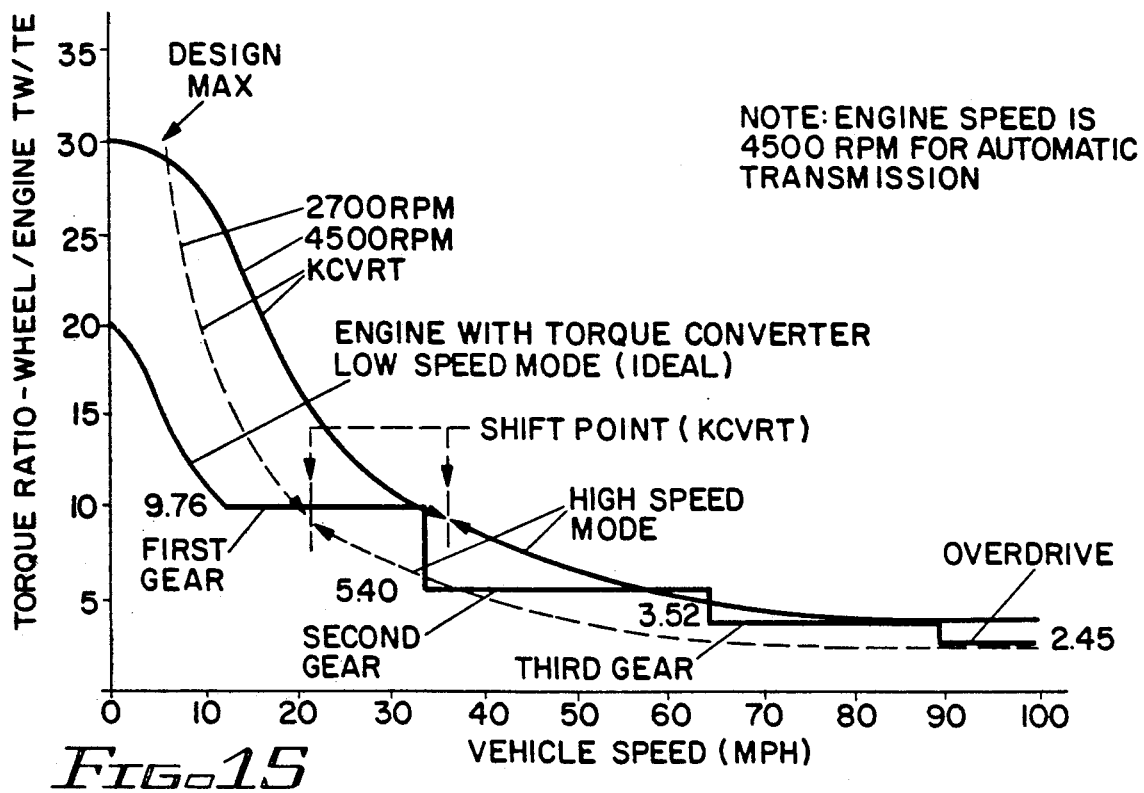
FIG. 15 is a graph which shows the acceleration torque advantages of the transmission of FIG. 9 relative to an automatic transmission in a mid-size vehicle.

The overall acceleration performance of the transmission is compared in FIG. 15 to a conventional automatic transmission which employs a three speed transmission with overdrive and torque converter. The engine speed is assumed to be limited to 4500 RPM. The design as given herein shows a significant acceleration advantage over the entire operating range. The elimination of the shifting losses in the conventional transmission as well as the losses associated with the reversing gears, and other additional clutch and gear losses makes the described transmission basically more efficient. Further, the usual major advantage of a CVT in being able to operate the engine at the minimum fuel consumption point for any power demand is also obtained in this transmission. It should be also observed that the drive with the transmission can be completely disconnected from the vehicle wheels by simply disengaging both the high and low speed mode clutches shown in FIG. 9 to give a neutral mode of operation called for in FIG. 12. The "parking" mode of operation could then consist of locking the output shaft with disengaged high and low speed mode clutches. Thus, the parking mode can give the desired minimum torque for "updating" the calibration of the slip measurement when starting the vehicle.

Figure 16:
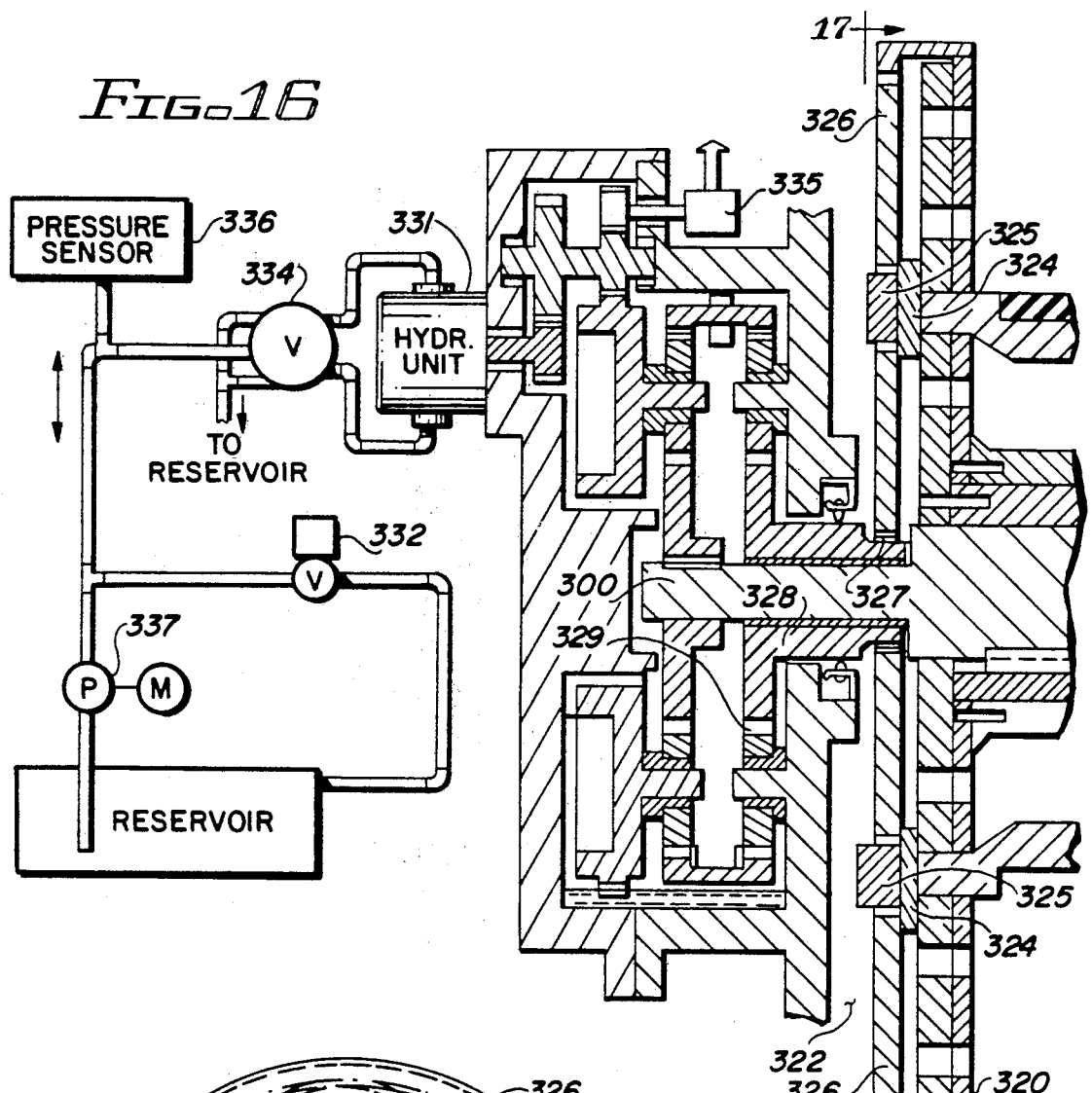
FIG. 16 is a partially broken away view illustrating a variant pulley actuator using hydraulic control elements to establish the effective diameter of a flat belt CVT.
Figure 17:
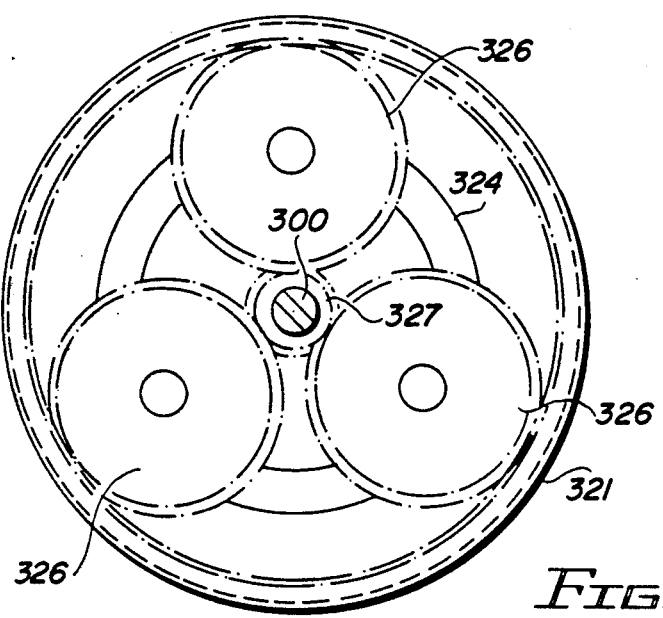
FIG. 17 is a cross sectional view taken along the lines 17—17 of FIG. 16 showing a variant torque increasing component of the actuator.

An attractive pulley actuator arrangement using hydraulics alternate to that shown in FIGS. 4 and 7 is shown in FIGS. 16 and 17. These Figs. show an actuator similar to those described in conjunction with FIGS. 4 and 7. Here, however, the differential gearing arrangement employed is a planetary geared assembly in place of a "harmonic gear" assembly. The inner guideway discs 320 are connected to a ring gear 321 of the differential planetary gear assembly 322. The outer guideway discs 323 are fastened to a circumferential ring 324 which acts as the planet carrier of the differential planetary gear assembly. Hence, the circumferential ring supports shafts 325 on which the planet gears 326 are mounted with their bearings. The planet gears connect with a sun gear 327 on an annular shaft 328 to another sun gear 329 in the actuator gear housing. The differential planetary gear assembly thus operates in the same basic fashion as the "harmonic drive" arrangement previously described, but with a much smaller gear ratio. The harmonic drive may have a gear ratio of 100 to one or more whereas the planetary gear ratio shown here is approximately 8.5 to one. However, any movement of the sun gear on the annular shaft relative to the pulley shaft connected to the outer guideway disc will rotate the inner guideway disc with respect to the outer guideway disc in the differential motion well known to designers of planetary gear systems.

Specifically, the inner guideway disc 320 will rotate at a speed of 1/8.5 or 0.1176 times the speed of the sun gear 327 on the annular shaft 328 relative to the speed of the pulley shaft connected to the outer guideway disc 323. The direction of rotation of the inner guideway disc 320 relative to the outer guideway disc 323 is opposite to the direction of rotation of the sun gear 327 on the annular shaft 328 relative to the pulley shaft 300. The actuator gear housing previously described consists of two sun gears normally of the same size with star and planet gears of equal size with a ring gear. The rotational positions of the star gears are stationary due to their shafts being fixed to the actuator gear box housing. If the planet carrier in the actuator gear box is held stationary, there can be no movement of the inner guideway discs relative to the outer guideway discs and the belt radial position is stationary in the pulley. However, the planet carrier to the actuator gear box may be rotated in either direction by the hydraulic power unit 331 operating through the gear reduction assembly. Any positional change of the planetary carrier results in a precise angular change in the position of the inner guideway disc 320 relative to the outer guideway disc 323, irrespective of the pulley operating speed. The angular direction change of the inner guideway disc relative to the outer guideway disc is dependent on the direction of rotation of the hydraulic unit 331. The angular position of the inner guideway disc relative to the outer guideway disc specifies the belt radial position with a given guideway geometry. Hence, measurement of the rotation of any of the gears in the gear train from the hydraulic power unit to and including the planetary carrier can be used to specify precisely the belt radial position in the pulley.

This information with input and output pulley speeds can now be easily used to determine the belt slip with substantial accuracy at any operating point as previously described. The hydraulic control elements shown in FIG. 16 were chosen to minimize the control operating power requirement. The pressure control valve 332 is operated to maintain only that hydraulic pressure (sensed by sensor 336) necessary for the actuator torques required for a specific output torques. Little if any flow passes through the hydraulic power unit 331 for any pulley operation at a constant pulley speed ratio where no rotation of the hydraulic power unit is required. The hydraulic power unit and oil pump are sized for the maximum movement speed required in the pulley system to change speed ratio. This maximum movement speed normally occurs in the automotive application during the maximum vehicle acceleration. The regenerative geared layout as shown in FIG. 9 together with the control schematic of FIG. 12 permits maximum vehicle output torque to be achieved changing the pulley speed ratio much more slowly than possible in previous continuously variable speed drives.

Hence, it is estimated that the maximum hydraulic power requirement for this system may be only about 0.25% of the pulley transmitted power and normally will be significantly less. A two position directional control valve 334 is used in the pulley B actuator to permit reversing the pressure differential on the hydraulic unit to obtain very rapid engine accelerations at a given vehicle speed for high speed passing. The hydraulic control arrangement is shown with only one of the two pulleys in the flat belt CVT arrangement. A similar unit is used on the other pulley. In the following description the letter A after a reference numeral refers to pulley A and the letter B after a reference numeral refers to pulley B. The signal or control on the pressure control valve 332 is normally used at one pulley to set the pulley belt drive radius as desired while the signal or control on the pressure control valve at the other pulley operates to give the desired belt tension and belt slip for the operating torque. Other arrangements including electric motors, etc. could also be used in the control of the pulley speed ratio and belt slip.

While the preceding description has given the control functions for the proposed operation of the continuously variable regenerative transmission, a specific description of a typical control and its elements corresponding to the above control functions is desirable. Accordingly, using an engine or Pulley B speed pickup 306B and Pulley A speed pickup 306A as shown on FIG. 9 together with the pulley radius position pickups 335A and 335B for Pulley A and B as shown on FIG. 16 for a pulley and also with the accelerator position input as shown on FIG. 12, the transmission control module 310 is arranged to operate one pulley to have specific operating belt radius and the other pulley to tension the belt to operate at a specific percent belt slip. The accelerator position input sets both the desired engine speed as a function of the vehicle speed, the specific relationship changing from the low speed mode to the high speed mode, as well as the desired percent belt slip, both functions increasing with increased accelerator position. The transmission clutches, as shown in FIG. 9 are operated both by the shift in vehicle mode (manual) and by a scheduled automatic operation upon reaching the shift point for the transmission, the shift direction depending on the accelerator demand for more or less vehicle speed. The objective of the entire control is to give a wheel to engine torque ratio versus the engine speed corresponding to FIG. 15.

Figure 18:
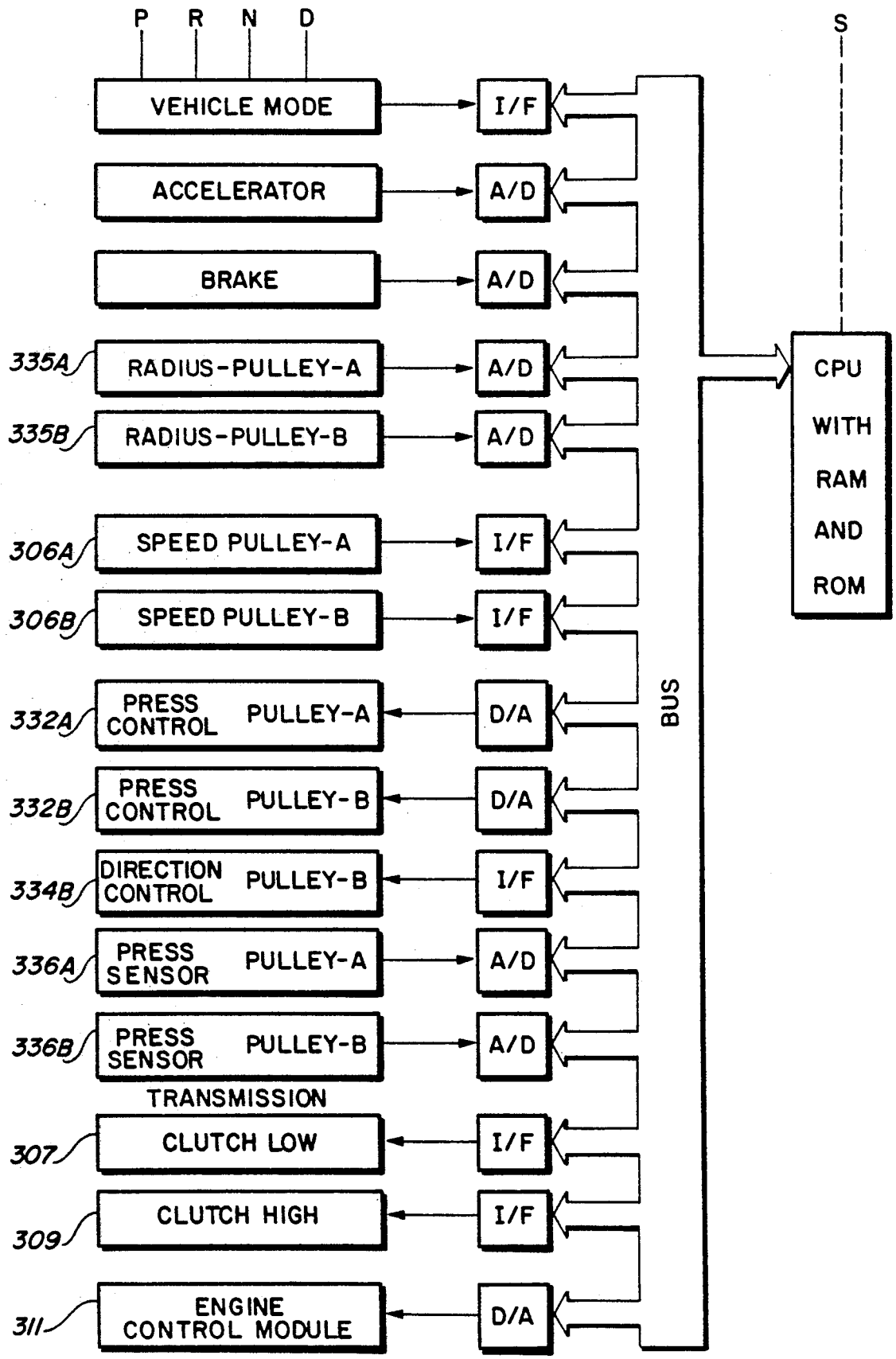
FIG. 18 is a block diagram for a transmission control module.

An electronic control diagram for the transmission control module 310 of FIG. 12 is given in FIG. 18 which shows that it functions as a digital computer controller and has a central processing unit (hereafter referred to as CPU) which carries out arithmetic and logic processing means on a repetitive sequential basis for all input signals. Simple connections to the CPU are referred to interfaces (I/F). The specific vehicle mode through its interface calls for specific operational routines to be used in the CPU. The speed pickups on Pulley A and B being digital in nature send their signals directly through an I/F to the CPU where a speed measurement is derived which then stored and updated in speed registers in the random access memory (RAM). The accelerator and brake use analogue to digital converters (A/D) for inputs to the CPU for processing by the CPU to be stored and updated in registers in the RAM. As previously described, the rotation of a gear in the actuator of Pulley B and the rotation of a gear in the actuator of Pulley A can accurately specify the radius of the belt surface in each pulley through analogue to digital outputs (A/D) 335B and 335A. This information is supplied for processing by the CPU for storage and updating in appropriate RAM registers for the pulley radii.

The output signals from the CPU to change the actuator torque in Pulley A or B operate by changing the valve flow areas in 332A or 332B, FIG. 16. Here, digital to analogue (D/A) converters are used to operate the valves.

Pressure sensors, 336A and 336B, FIG. 16, are used in the actuator controls on the two pulleys to send their signals through analogue to digital converters to the CPU. The directional control valve 334B on the actuator of Pulley B is operated by the CPU through an interface to reverse momentarily the normal actuator torque to obtain a special short duration very rapid pulley radius change for accelerating the engine when operating in the high speed mode, i.e., for a rapid vehicle acceleration in passing.

The transmission clutch controls are off-on hydraulic valves that are triggered by the CPU. If no current is supplied to solenoid 307 or 309, FIG. 9, spring centering of valve 308 causes no pressure on either the HC or HL clutch leaving them open with no connection between the wheels and the transmission. The type of the output from the CPU to the engine depends on the nature of the entire control module. It may be capable to responding to a digital input or it may require an analogue input. A digital to analogue output is indicated in FIG. 18. A read only memory (ROM) is included in the transmission control for the various design constants, i.e., gear ratios and needed algorithms such as the specific relation of actuator control gear rotation to pulley belt radius in each pulley and the desired engine speed versus vehicle speed for various accelerator or brake input positions in the two speed modes. The ROM would also include the essential algorithm giving the desired operating belt slip as a function of the accelerator or brake input position.

Typical operational ranges for the pulley radii and speeds are listed in FIG. 19 for the various vehicle modes and accelerator or brake position, for a medium size vehicle giving a maximum torque of 165 ft. lb. The manner in which each pulley varies in radius relative to the other for each operating condition is specified.

Figure 20:
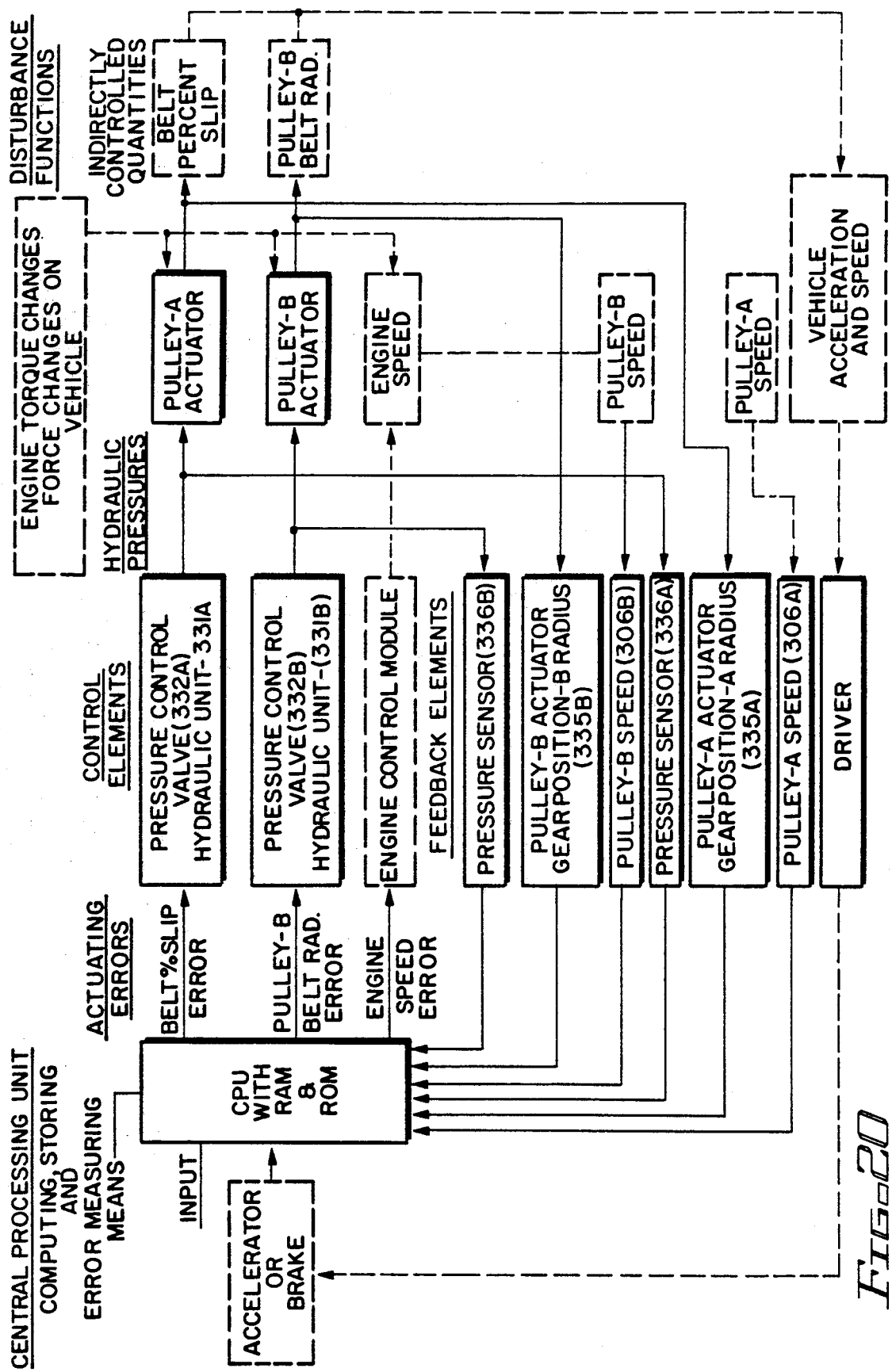
FIG. 20 is a block diagram of a feedback control system.

A block diagram of the feedback control system is given in FIG. 20. The driver initiates the operation and is the over-riding feedback element as shown in the schematic diagram.

Figure 21:
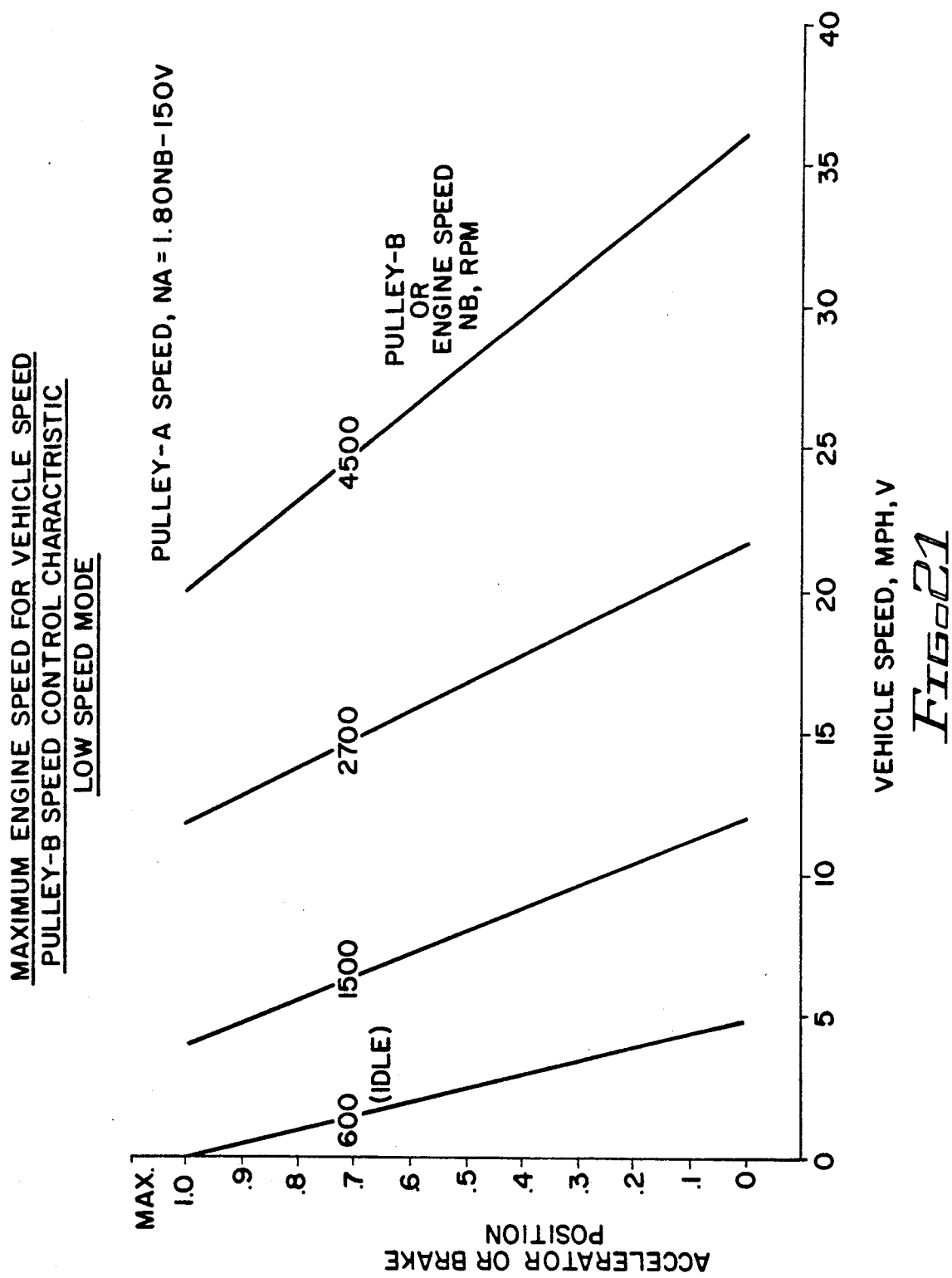
FIG. 21 is a graph comparing a desired engine speed to a vehicle speed ratio.
Figure 23:
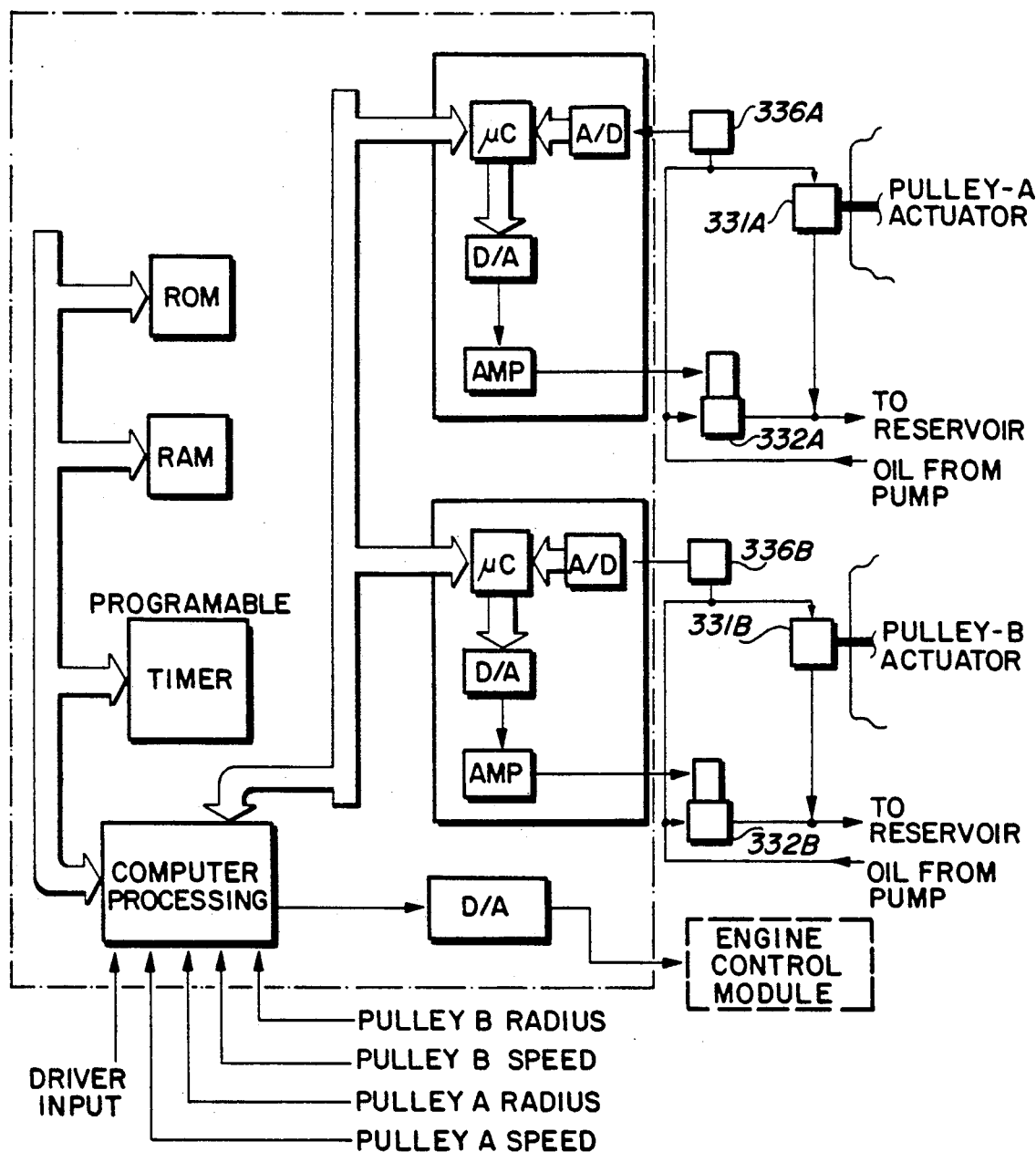
FIG. 23 is a block diagram showing the CPU and hydraulic control elements of the pulley actuators.

Consider the typical operation sequence of the electronic transmission control incorporating the operating schedule of FIG. 19. Assume the vehicle's engine is started with the vehicle mode at park (P). The CPU, using a self contained clock and battery, is triggered by the starter switch S (FIG. 18) to begin a repetitive sampling of the registers for all bus connected elements. In the park mode, the pressures on the control valve 332A of Pulley A and control valve 332B of Pulley B, FIG. 16, are set initially so that with both transmission clutches HC and LC, (FIG. 9) open, the pulleys operate with essentially no slip since there is no output torque. The open clutches HC and LC after an appropriate delay actuate an interrupt service routine which causes the CPU to calculate the value of "a" from the pulley speeds and pulley radii as previously described and store this information in the RAM. Upon shifting from park the conventional output gear lock 314 FIG. 9, is disengaged. While no transmission clutch is engaged in neutral, shifting to either forward or reverse, causes the low transmission clutch LC FIG. 9 to be engaged. Stepping on the accelerator causes the CPU to sense a change in its position relative to previous value stored in the RAM, i.e., using an optical shaft encoder to give a digital input. This actuates a specific interrupt service routine suitable for the vehicle drive mode in the low speed mode condition. This interrupt service routine, using the previous data stored in the registers, then calculates the desired percent belt slip as described previously and compares it to the operating belt slip value (as stored in the RAM). The difference (+ or −) is used as an input to increase or decrease the control pressure on Pulley A actuator through a command to the pressure control valve 332A, FIG. 16. For an increase in the desired belt slip, the pressure to Pulley A hydraulic unit 331A, FIG. 16, is increased thereby trying to increase the belt radial position in Pulley A. The interrupt service routine may then continue by comparing the desired engine or Pulley B speed to the vehicle speed ratio as given on FIG. 21 to that requested by the accelerator position when operating in the low speed vehicle mode. The difference is then used to decrease or increase the control pressure on Pulley B actuator through a command to the pressure control valve 332B, FIG. 16. The vehicle speed is easily computed by the CPU knowing the speed mode and Pulley A and B speeds using the ROM. For the desired increase in vehicle speed, the Pulley B radius will be controlled to decrease while the Pulley A radius increases in the low speed drive mode as indicated in FIG. 19. The interrupt service routine may then continue by comparing the desired engine speed (Pulley B speed) with the existing engine speed as stored in the RAM and using the accelerator position input call for a specific speed change by an input to the engine control module. The engine control module changes the engine speed by varying the fuel flow to the engine changing the engine torque. While the engine control module is not a direct part of the transmission control module, the electronic signals from the transmission control module basically control the engine speed. The stability of the overall control depends on the specific feedback loops gains but the scheduling of the interrupt service routines recognize the need for updating and controlling the percent belt slip more frequently than the belt radius ratio change and a signal to change the engine speed. The vehicle speed change due to the vehicle inertia is much slower than the possible pulley speed ratio and engine speed changes. Thus, with the geared relationship, the transmission speed ratio change essentially limits how fast the engine speed is permitted to change by the speed of changes in the belt radius ratio. However, the computer processing unit can access very rapidly all sensors and update all registers in the RAM repetitively every 0.1 millisecond. Thus, if the interrupt service routine for the belt radius change in Pulley B were initiated every 100 milliseconds (10 times a second), it is practical to incorporate and initiate a much faster interrupt service routine—every 20 milliseconds for the desired percent belt slip. This allows the belt slip to be controlled substantially even during changes in pulley speed ratio. The actual computer processing and error commands can be accomplished very rapidly upon initiation of an interrupt service routine—normally less than a millisecond for each routine—so that the computer processing unit will spend most of its time accessing sensors and updating the RAM registers. The CPU and the hydraulic control elements of the actuators are given in more detail in FIG. 23. Here it is shown that the hydraulic controllers each consist of a micro computer controller for the hydraulic pressure as commanded by an error command from the central CPU with its interrupt service routines based on a programmed timer. The hydraulic control with its feedback loop can operate quite rapidly—order of a few milliseconds for large pressure changes at hydraulic unit 331 for the actuator. The internal hydraulic micro controller functions much faster than the time intervals programmed for the interrupt service routines that can send a new command to the micro controllers. This permits a stable system operation. Thus, the CPU can initiate and cause all three controls—for the percent belt slip, the Pulley B radius (or the pulley radius ratio) and the engine speed—to function simultaneously using the high speed digital capabilities of a CPU.

Figure 22:
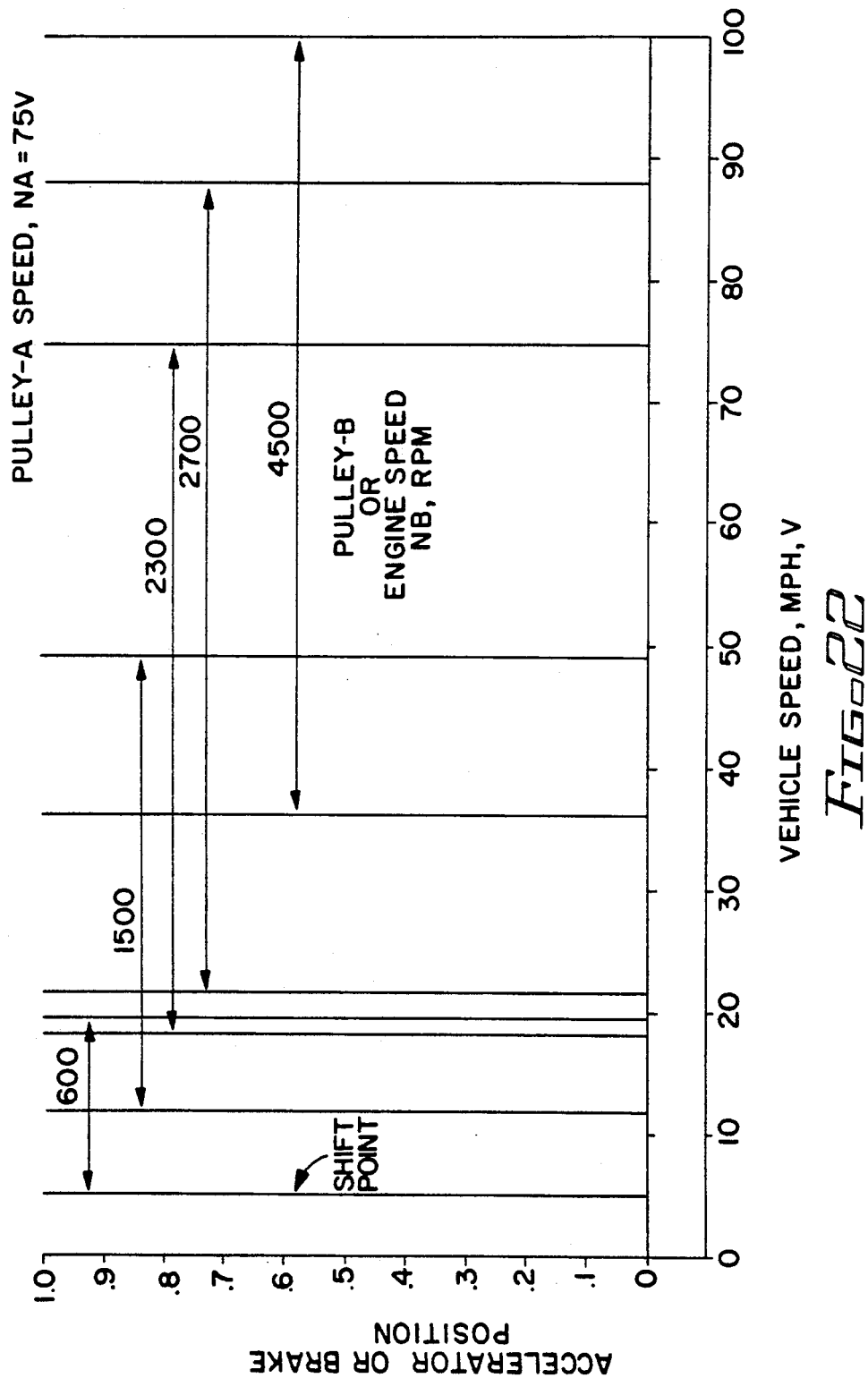
FIG. 22 is a graph which shows the operational vehicle speed range in the high speed mode versus the accelerator or brake position.

As the vehicle accelerates in the low speed mode, the engine speed is controlled to increase and belt radius in Pulley B decreases to its minimum position. Upon arriving at Pulley B minimum radius, an interrupt service routine causes the engagement of the transmission clutch control 309 and disengages the clutch control 307, FIG. 9, if the accelerator calls for additional vehicle speed. As previously described, this clutch actuation occurs with the LO gear and HO gear at the same speed. The control now operates in the high speed mode and uses a different algorithm for setting the engine speed as a function of the accelerator position as shown on FIG. 22. Also, the control for the hydraulic pressure changes at the Pulley B control valve 332B is reversed from the low speed mode operation in that an accelerator input calling for increased vehicle speed will increase the Pulley B radius using the actuator hydraulic unit 331B, FIG. 16 rather than a decrease in the Pulley B radius as in the low speed mode. However, the high speed mode operation has one variant in that a high acceleration vehicle passing maneuver is significantly aided by a momentary reversing of the hydraulic control pressure to the actuator of Pulley B. This is accomplished in a special interrupt service routine for Pulley B belt radius control that reverses Pulley B actuator torque by reversing the inlet and outlet flows to the Pulley B hydraulic unit 331B FIG. 16 using the directional control valve 334B. The momentary pressure reverse causes the actuator in pulley to aid in reducing the Pulley B radius thus allowing the engine speed to accelerate rapidly from a low cruise speed to generate the desired power for the vehicle passing maneuver. The triggering for this special interrupt service routine depends on the accelerator forward rate of movement and its duration would be limited and end by returning the directional control valve 334B to its original position. During all such operations, the more rapid sequence of the interrupt service routines for the pressure to the actuator hydraulic unit 331A on Pulley A will operate to maintain, within limits, the desired percent belt slip in the transmission or pulley torque giving a desired output torque. Thus, the engine acceleration can be tailored to avoid a significant vehicle hesitation lag in the driver demand for greatly increased power. The operational vehicle speed range in the high speed mode vs the low speed mode is shown in the typical case on FIG. 13 versus the pulley speed ratio and on FIG. 21 and FIG. 22 versus the accelerator or brake position. The shift from the high speed mode to the low speed mode occurs whenever the accelerator position calls for a reduction in vehicle speed when Pulley A has reached its maximum radius position (or Pulley B has reached its minimum radius, or if L gear and H gear (FIG. 9) are sensed to have the same speed). Here, the transmission clutch control 307 is switched on and control 309 is switched off FIG. 9 and the CPU is now operated in the low speed mode. This control arrangement can be adapted to permit the engine to give significant dynamic braking by compressing air in either speed mode. In dynamic braking, no fuel is supplied to the engine and the engine speed is varied versus the vehicle speed as requested by the brake position to vary the power absorption. The engine speed ranges as given in FIG. 21 and 22 as well as FIG. 13 apply also to the dynamic braking operation. Thus, the maximum engine speed of 4500 RPM could be used if necessary for maximum dynamic braking all the way from maximum vehicle speed to zero vehicle velocity. The pulley torques reverse from the previous forward drive situation but the control elements all function in the same fashion. Such dynamic braking would be a very useful aid to conventional hydraulically operated brakes and could materially reduce their operational requirements. Shifting to reverse is accomplished with the transmission in the low speed mode only. Here, the control for the hydraulic pressure changes at the Pulley B control valve 332B is reversed from the low speed mode operation in that an accelerator input calling for increased reverse vehicle speed will increase rather than decrease the Pulley B radius using the actuator hydraulic unit 331B. This is the same operation as in the high speed mode except that the power flow is through the planetary gear system and low speed mode clutch LC (FIG. 9). The essential % belt slip control basically functions to vary the pulley torque and consequently the torque to the wheels under all operating conditions.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. A continuously variable, regenerative transmission mechanically disposed intermediate a prime mover source of variable rotational power and variable unidirectional rotational speed output and a geared output shaft having a variable rotational rate and variable rotational direction, said regenerative transmission comprising:
    (A) a continuously variable transmission assembly
        (1) a first variable diameter pulley;
        (2) a first actuator for establishing the diameter of said first variable diameter pulley;
        (3) a second variable diameter pulley;
        (4) a second actuator for establishing the diameter of said second variable diameter pulley; and
        (5) a belt coupling said first and second variable diameter pulleys;
    (B) an input shaft coupled to said first variable diameter pulley and to a prime mover;
    (C) a sun gear shaft coupled to said second variable diameter pulley, said sun gear shaft carrying a high gear rotating therewith;

(D) a planetary gear assembly coupled to said sun gear shaft, said planetary gear assembly including:
  (1) a sun gear rotating with said sun gear shaft;
  (2) a planet carrier rotatably about said sun gear shaft axis;
  (3) a plurality of planet gears carried by said planet carrier and meshing with said sun gear;
  (4) a ring gear meshing with said planet gears; and
  (5) a low gear rotating with said ring gear;
(E) transfer means coupling rotation of said input shaft to said planet carrier;
(F) an output shaft, said output shaft having an output gear rotating therewith;
(G) a high output gear rotatably carried by said output shaft, said high output gear being coupled to said high gear;
(H) a low output gear rotatably carried by said output shaft, said low output gear being coupled to said low gear;
(I) a high clutch adapted to selectively couple said high output gear to said output shaft;
(J) a low clutch adapted to selectively couple said low output gear to said output shaft; and
(K) control means including:
  (1) means to sense the rate of rotation of said output gear, on said output shaft;
  (2) means to give a desired rotational direction of said output gear, on said output shaft;
  (3) means to sense the rotation-al direction of said output gear, on said output shaft;
  (4) means to sense the rate of rotation of a prime mover;
  (5) means to adjust the rate of rotation of a prime mover;
  (6) means to actuate at least one of said high and low clutches; and
  (7) means to adjust said first and second actuators to obtain a belt slip that corresponds to a pulley torque versus belt tension which results in rotation of said output gear in the desired direction at a rate according to a predetermined ratio of the rate of rotation of the prime mover with respect to the rate of rotation of said output gear.

2. The continuously variable, regenerative transmission of claim 1 in which said transfer means comprises an idler gear.

3. The continuously variable, regenerative transmission of claim 1 in which said transfer means comprises a belt.

4. A continuously variable, regenerative transmission mechanically disposed intermediate a prime mover source of variable rotational power and variable unidirectional rotational speed output and a geared output shaft having a variable rotational rate and variable rotational direction, said regenerative transmission comprising:
  (A) a continuously variable transmission assembly including:
    (1) first and second pulley assemblies, each said pulley assembly including:
      (a) a pulley assembly shaft with an axis of rotation;
      (b) a pair of pulley sheaves;
      (c) a series of belt engaging elements, each of said belt engaging elements having:
        (i) an elongated central shank including a drive surface adapted to be engaged by said drive belt;
        (ii) a first bearing region at a first end of said central shank; and
        (iii) a second bearing region at a second end of said central shank;
      (d) each of said pulley sheaves including: a pair of relatively movable guideway disks lying alongside each other in juxtaposition, an inner guideway disk of each said pair including a first series of spiral guideways extending radially in one direction, an outer guideway disk of each said pair including a second series of spiral guideways extending radially in a second direction, said first and second series of spiral guideways providing intersections for capturing and locating said bearing regions of said belt engaging elements, said intersections providing locations for said bearing regions to establish radial positions of said belt engaging elements with respect to said shaft;
      (e) means connecting said inner guideway disks of said pulley sheaves together to establish an inner guideway disk set which rotates about the axis of said shaft;
      (f) means connecting said outer guideway disks of said pulley sheaves together to establish an outer guideway disk set which rotates about the axis of said shaft;
      (g) means coupling at least one of said guideway disks to said shaft for rotation therewith; and
      (h) means for adjusting the rotational position on said shaft between said inner guideway disk set and said outer guideway disk set to establish the radial position of said belt engaging elements of said pulley assembly; and
    (2) a flat drive belt coupling said first and second pulley assemblies;
  (B) an input shaft coupled with said assembly shaft of said first pulley assembly and to a prime mover;
  (C) a sun gear shaft coupled with said assembly shaft of said second pulley assembly, said sun gear shaft carrying a high gear rotating therewith;
  (D) a first planetary gear assembly coupled to said sun gear shaft, said planetary gear assembly including:
    (1) a sun gear rotating with said sun gear shaft;
    (2) a planet carrier rotatably about said sun gear shaft axis;
    (3) a plurality of planet gears carried by said first planet carrier and meshing with said sun gear;
    (4) a ring gear meshing with said set of planet gears; and
    (5) a low gear rotating with said first ring gear;
  (E) transfer means coupling rotation of said input shaft to said planet carrier;
  (F) an output shaft, said output shaft having an output gear rotating therewith;
  (G) a high output gear rotatably carried by said output shaft, said high output gear being coupled to said high gear;
  (H) a low output gear rotatably carried by said output shaft, said low output gear being coupled to said low gear;
  (I) a high clutch adapted to selectively couple said high output gear to said output shaft;
  (J) a low clutch adapted to selectively couple said low output gear to said output shaft; and
  (K) control means including:

(1) means to sense the rate of rotation of said output gear, on said output shaft;
(2) means to give a desired rotational direction of said output gear, on said output shaft;
(3) means to sense the rotational direction of said output gear, on said output shaft;
(4) means to sense the rate of rotation of a prime mover;
(5) means to adjust the rate of rotation of a prime mover;
(6) means to actuate at least one of said high and low clutches; and
(7) means to adjust said first and second actuators to obtain a belt slip value that corresponds to a pulley torque versus belt tension which results in rotation of said output gear in the desired direction at a rate according to a predetermined ratio of the rate of rotation of the prime mover with respect to the rate of rotation of said output gear.

5. The continuously variable, regenerative transmission of claim 4 in which said means for adjusting the angular relationship between said inner guideway disk set and said outer guideway disk set of at least one of said pulley assemblies comprises:
(A) a second planetary gear system mechanically disposed intermediate said inner guideway disk set and said outer guideway disk set, said second planetary gear system including:
(1) a second sun gear coupled to said inner guideway disk set;
(2) a third sun gear coupled to said outer guideway disk set;
(3) said second and third sun gears being axially aligned;
(4) a rotatable planet carrier with a variable angular position relative to said sun gears;
(5) a second set of planet gears meshing with one of said second and third sun gears, said second set of planet gears being supported on said rotatable planet carrier;
(6) a set of star gears meshing with the other of said second and third sun gears, each of said star gears being supported in fixed angular position with respect to said other of said second and third sun gears;
(7) an internal ring gear meshing with said second set of planet gears and said star gears; and
(8) means for selectively changing the angular relationship between the said rotatable planet carrier and said star gears.

6. The continuously variable, regenerative transmission of claim 5 in which said means for selectively changing the angular relationship between said second planet carrier and said star gears further includes:
(A) an external ring gear carried by said second planet carrier;
(B) a pinion meshing with said external ring gear; and
(C) means for selectively rotating said pinion.

7. The continuously variable, regenerative transmission of claim 6 in which said means for selectively rotating said pinion includes a reversible electric motor-generator.

8. The continuously variable, regenerative transmission of claim 6 in which said means for selectively rotating said pinion includes a reversible hydraulic motor-pump unit.

9. The continuously variable regenerative transmission of claim 5 which further includes a gear system mechanically disposed intermediate one of said second and third sun gears and the one of said inner or outer guideway disk sets to which said one sun gear is coupled, differentially coupling:
A. one of said second or third sun gears;
B. said inner guideway disk structure; and
C. said outer guideway disk structure; said differential gear system giving a smaller degree of change to the angular relationship between said inner and outer guideway disk sets than the change in angular relationship between the said second and third sun gears when coupled directly to said inner and outer guideway disk sets.

10. The continuously variable, regenerative transmission of claim 9 in which said means for selectively changing the angular relationship between said second planet carrier and said star gears further includes:
(A) an external ring gear carried by said planet carrier;
(B) a pinion meshing with said external ring gear; and
(C) means for selectively rotating said pinion.

11. The continuously variable, regenerative transmission of claim 10 in which said means for selectively rotating said pinion includes a reversible electric motor-generator unit.

12. The continuously variable, regenerative transmission of claim 10 in which said means for selectively rotating said pinion includes a reversible hydraulic motor-pump unit.

13. The continuously variable, regenerative transmission of claim 9 in which said differential gear system comprises a harmonic drive.

14. The continuously variable, regenerative transmission of claim 13 in which said means for selectively changing the angular relationship between said second planet carrier and said star gears further includes:
(A) an external ring gear carried by said planet carrier;
(B) a pinion meshing with said external ring gear; and
(C) means for selectively rotating said pinion.

15. The continuously variable transmission of claim 13 in which said means for selectively rotating said pinion includes a reversible electric motor-generator unit.

16. The continuously variable transmission of claim 13 in which said means for selectively rotating said pinion includes a reversible hydraulic motor-pump unit.

17. The continuously variable, regenerative transmission of claim 4 in which said transfer means comprises an idler gear.

18. The continuously variable, regenerative transmission of claim 4 in which said transfer means comprises a belt.

19. The continuously variable, regenerative transmission of claim 5 in which said transfer means comprises an idler gear.

20. The continuously variable, regenerative transmission of claim 5 in which said transfer means comprises a belt.

21. A continuously variable transmission assembly including:
(A) a first variable diameter pulley;
(B) a first actuator for establishing the diameter of said first variable diameter pulley;
(C) a second variable diameter pulley;
(D) a second actuator for establishing the diameter of said second variable diameter pulley;

(E) a belt coupling said first and second variable diameter pulleys; and (F) means to measure and calculate belt slip in said pulleys when rotating to give pulley torque in said power transmitting belt driven pulley system, said means including:

(1) means to measure the radius of the pulley surface of each pulley;

(2) means to measure the distance from each pulley surface to the mean load bearing location of said belt at a pulley torque similar to or less than that obtained when operating the engine input at idle or minimum speed;

(3) means to measure the speed of each pulley in RPM; and (4) means to utilize the said measurements to determine belt slippage during operation according to the formula: percent slip $=(1-N_2RC_2)/(N_1RC_1)$ 100% wherein

R = the radius of a pulley surface in feet;
a = the distance of a pulley surface to the load bearing location of said belt;
N = the speed of a pulley in RPM;
1 = the driving pulley;
2 = the driven pulley
$RC_1 = R_1 + a$
$RC_2 = R_2 + a$.

22. The continuously variable transmission assembly of claim 21 wherein said means to measure and calculate belt slip additionally includes means to utilize said measurement of belt slip to operate means on said pulleys to alter the pulley radius ratio and belt tension.

23. The continuously variable transmission of claim 21 or claim 22 wherein said belt is a flat belt.

24. A transmission assembly including:

(A) a first fixed diameter pulley;

(B) a second fixed diameter pulley;

(C) a belt coupling said first and second fixed diameter pulleys;

(D) means to measure and calculate belt slip in said pulleys when rotating to give pulley torque in said power transmitting belt driven pulley system, said means including:

(1) means to measure the radius of the pulley surface of each pulley;

(2) means to measure the distance from each pulley surface to the mean load bearing location of said belt at very low torque;

(3) means to measure the speed of each pulley in RPM; and (4) means to utilize the said measurements to determine belt slippage during operation according to the formula:

percent slip $=(1-N_2RC_2)/(N_1RC_1)$ 100% wherein

R = the radius of a pulley surface in feet;
a = the distance of a pulley surface to the load bearing location of said belt;
N = the speed of a pulley in RPM;
1 = the driving pulley;
2 = the driven pulley
$RC_1 = R_1 + a$
$RC_2 = R_2 + a$.

* * * * *

UNITED STATES PATENT AND TRADEMARK OFFICE
CERTIFICATE OF CORRECTION

PATENT NO. : 5,011,458

DATED : April 30, 1991

INVENTOR(S) : Emerson L. Kumm

It is certified that error appears in the above-identified patent and that said Letters Patent is hereby corrected as shown below:

Column 26, line 55, after the word "Assembly", add ---including---.

Column 27, line 29, the word "rotation-al" should read ---rotational---.

Column 32, line 18, cancel "very low torque" and substitute therefor ---a pulley torque similar to or less than that obtained when operating the engine input at idle or minimum speed---.

Signed and Sealed this

First Day of September, 1992

Attest:

DOUGLAS B. COMER

*Attesting Officer*   Acting Commissioner of Patents and Trademarks